United States Patent
Shimomoto

(10) Patent No.: US 10,168,972 B2
(45) Date of Patent: Jan. 1, 2019

(54) TERMINAL APPARATUS AND OPERATION DESIGNATION METHOD

(71) Applicant: Ryoh Shimomoto, Kanagawa (JP)

(72) Inventor: Ryoh Shimomoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 277 days.

(21) Appl. No.: 14/847,096

(22) Filed: Sep. 8, 2015

(65) Prior Publication Data

US 2016/0077781 A1 Mar. 17, 2016

(30) Foreign Application Priority Data

Sep. 16, 2014 (JP) .................................. 2014-187360
Aug. 24, 2015 (JP) .................................. 2015-164570

(51) Int. Cl.
| | | |
|---|---|---|
| G06F 3/14 | (2006.01) | |
| G06F 3/03 | (2006.01) | |
| G06F 3/0484 | (2013.01) | |
| H04N 1/00 | (2006.01) | |
| G06F 3/0346 | (2013.01) | |
| G06F 3/12 | (2006.01) | |

(52) U.S. Cl.
CPC .............. *G06F 3/14* (2013.01); *G06F 3/0304* (2013.01); *G06F 3/0346* (2013.01); *G06F 3/0484* (2013.01); *G06F 3/1204* (2013.01); *G06F 3/1226* (2013.01); *G06F 3/1292* (2013.01); *H04N 1/0035* (2013.01); *G06F 3/1231* (2013.01); *G09G 2356/00* (2013.01)

(58) Field of Classification Search
CPC .... G06F 3/0304; G06F 3/0346; G06F 3/0484; G06F 3/12; G06F 3/14; G06F 3/1204; G06F 3/1226; G06F 3/1292; G06F 3/1231; H04N 1/0035; G09G 2356/00
USPC .................................. 345/156, 169, 173–179
See application file for complete search history.

(56) References Cited

U.S. PATENT DOCUMENTS

2013/0208312 A1* 8/2013 Morita ................ G06F 3/04883
358/1.15

FOREIGN PATENT DOCUMENTS

| | | |
|---|---|---|
| JP | 2012-090077 | 5/2012 |
| JP | 2013-161246 | 8/2013 |
| JP | 2014-110025 | 6/2014 |

* cited by examiner

*Primary Examiner* — Stacy Khoo
(74) *Attorney, Agent, or Firm* — IPUSA, PLLC

(57) ABSTRACT

A terminal apparatus includes a position determination unit for determining a position of the terminal apparatus; an imaging unit for capturing an image; a direction determination unit for determining an imaging direction of the imaging unit; an identification unit for identifying an input/output apparatus captured by the imaging unit based on position information of the input/output apparatus, the position of the terminal apparatus, and the imaging direction of the imaging unit; an operation unit for accepting an operation of a user with respect to the image captured by the imaging unit including an image of the input/output apparatus displayed by a display unit; and a request processing unit for making a request to the input/output apparatus for an operation to be performed by the input/output apparatus based on the operation of the user with respect to the image captured by the imaging unit including the input/output apparatus.

12 Claims, 23 Drawing Sheets

FIG.10

| ID | DEVICE NAME | LATITUDE | LONGITUDE | ALTITUDE | IP ADDRESS | INPUT FUNCTION | OUTPUT FUNCTION |
|---|---|---|---|---|---|---|---|
| 1 | PROJECTOR1 | 35.459616 | 139.388889 | 10.388889 | 192.168.0.2 | NO | YES |
| 2 | MFP1 | 35.459616 | 139.388889 | 9.459616 | 192.168.0.3 | YES | YES |
| ⋮ | ⋮ | ⋮ | ⋮ | ⋮ | ⋮ | ⋮ | ⋮ |

| DEVICE NAME | INPUT FUNCTION | OUTPUT FUNCTION |
|---|---|---|
| MFP1 | SCAN | PRINT, EMAIL, FAX |
| PJS1 | PROJECTION IMAGE ACQUISITION | PROJECTION |
| PJS2 | – | PROJECTION |
| IWB1 | DISPLAY FILE ACQUISITION | DISPLAY, ADD |
| PRINTER1 | – | PRINT |
| SCANNER1 | SCAN | – |

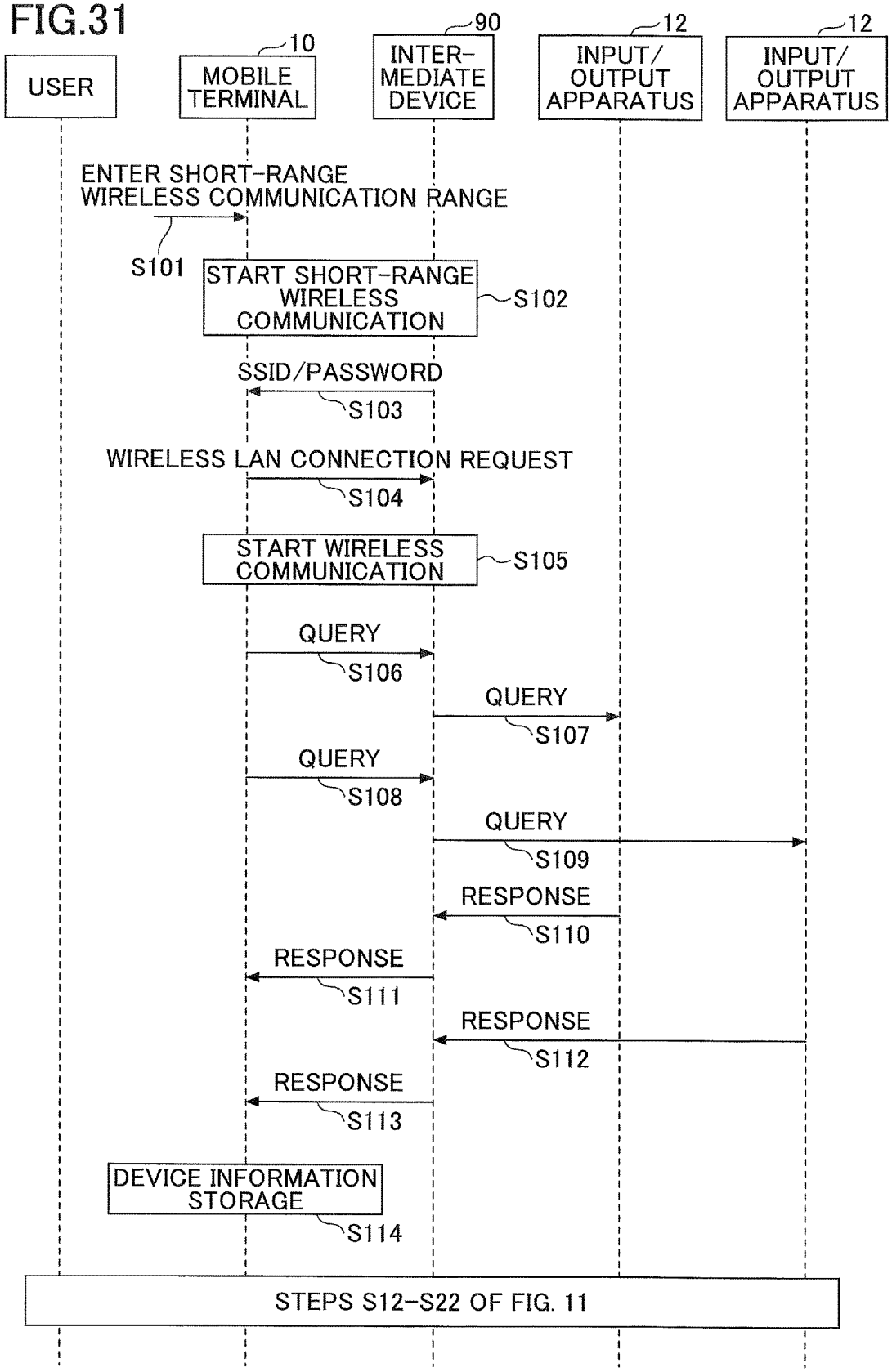

TERMINAL APPARATUS AND OPERATION DESIGNATION METHOD

BACKGROUND OF THE INVENTION

1. Field of the Invention

The present invention relates to a terminal apparatus and an operation designation method.

2. Description of the Related Art

Mobile terminals that are configured to enable a user to intuitively operate a processing apparatus such as an image forming apparatus are known. Such mobile terminals include an imaging unit for capturing an image in a specific direction and a control unit for combining the image captured by the imaging unit with an operation screen for remotely operating a predetermined processing apparatus and controlling a display unit to display the resulting composite image (see e.g. Japanese Laid-Open Patent Publication No. 2012-90077).

For example, a user may operate an input/output apparatus such as a printer, a multifunction peripheral (MFP), or a projector that is connected to a network such as a LAN using various types of terminal apparatuses such as a mobile phone, a smartphone, a tablet terminal, and the like. In such case, the user has to designate the input/output apparatus to be operated and the operation to be performed by the input/output apparatus from the terminal apparatus.

However, with conventional terminal apparatuses, an operation to be performed by the input/output apparatus cannot be intuitively designated and the user is prone to make mistakes. Also, Japanese Laid-Open Patent Publication No. 2012-90077 does not disclose a mobile terminal for intuitively designating an operation to be performed by a processing apparatus.

SUMMARY OF THE INVENTION

An aspect of the present invention is directed to providing a terminal apparatus and an operation designation method for intuitively designating an operation to be performed by an input/output apparatus from a terminal apparatus.

According to one embodiment of the present invention, a terminal apparatus is provided that includes a position determination unit configured to determine a position of the terminal apparatus; an imaging unit configured to capture an image; a direction determination unit configured to determine an imaging direction of the imaging unit; an identification unit configured to identify an input/output apparatus captured by the imaging unit based on position information of the input/output apparatus, the position of the terminal apparatus, and the imaging direction of the imaging unit; an operation unit configured to accept an operation of a user with respect to the image captured by the imaging unit including an image of the input/output apparatus that is displayed by a display unit; and a request processing unit configured to make a request to the input/output apparatus for an operation to be performed by the input/output apparatus based on the operation of the user with respect to the image captured by the imaging unit including the image of the input/output apparatus.

BRIEF DESCRIPTION OF THE DRAWINGS

FIG. 10 is table illustrating an exemplary configuration of device information managed by the information processing apparatus;

FIG. 31 is a sequence chart illustrating an exemplary process of the communication system according to an embodiment of the present invention.

DESCRIPTION OF THE PREFERRED EMBODIMENTS

In the following, embodiments of the present invention are described with reference to the accompanying drawings.

First Embodiment

<System Configuration>

Figure 1:
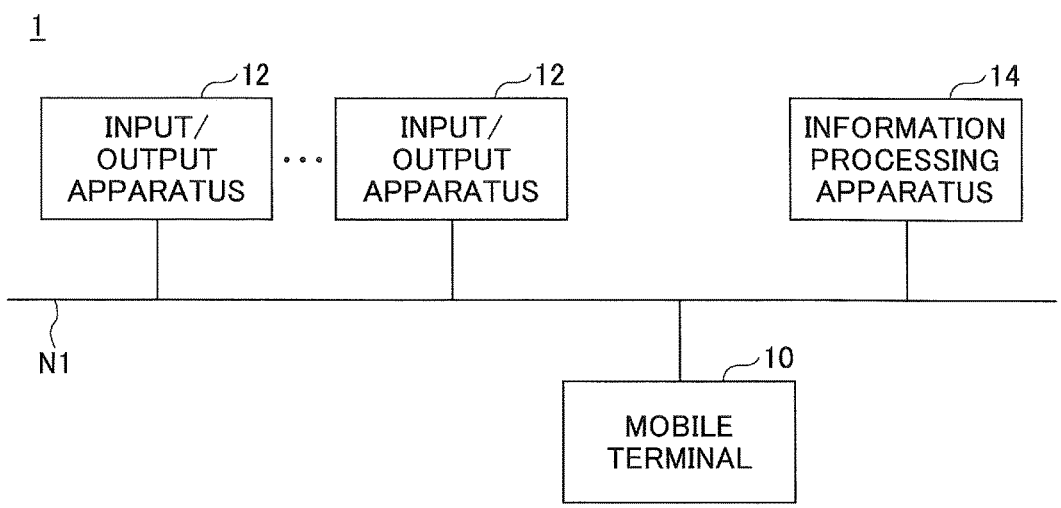
FIG. 1 is a block diagram illustrating an exemplary configuration of an input/output system according to an embodiment of the present invention.

FIG. 1 illustrates an exemplary configuration of an input/output system 1 according to an embodiment of the present invention. In FIG. 1, the input/output system 1 includes a mobile terminal 10, one or more input/output apparatuses 12, and an information processing apparatus 14 that are connected to a network N1 such as a LAN.

The mobile terminal 10 may be a terminal apparatus such as a smartphone, a tablet terminal, a mobile phone, or a PC that is operated by a user, for example. The input/output apparatus 12 is an example of an electronic device to be operated from the mobile terminal 10. The input/output apparatus 12 may be a projector, an interactive whiteboard (IWB), a multifunction peripheral (MFP), or some other type of electronic device.

The information processing apparatus 14 manages device information relating to the one or more input/output apparatuses 12 as described below, and provides the device information to the mobile terminal 10. The information processing apparatus 14 may be configured by a single computer or distributed across multiple computers, for example.

In the input/output system 1 of FIG. 1, a user operates the mobile terminal 10 to designate the input/output apparatus 12 to be operated and designate an operation to be performed by the input/output apparatus 12. For example, if the input/output apparatus 12 to be operated is an MFP, the user may operate the mobile terminal 10 to designate an operation for transmitting print data from the mobile terminal 10 to the MFP and printing the print data at the MFP. Also, the user may operate the mobile terminal 10 to designate an operation for transmitting image data scanned by the MFP to the mobile terminal 10 and storing the image data in the mobile terminal 10, for example.

Also, in a case where the input/output apparatus 12 is an interactive whiteboard (IWB), the user may operate the mobile terminal 10 to designate an operation for transmitting image data and application data from the mobile terminal 10 to the IWB and displaying the data at the IWB, for example. Also, the user may designate an operation for transmitting image data of handwritten content written on the data displayed at the IWB to the mobile terminal 10 and storing the image data in the mobile terminal 10, for example. Further, in a case where the input/output apparatus 12 is a projector, the user may operate the mobile terminal 10 to designate an operation for transmitting image data and application data from the mobile terminal 10 to the projector and projecting the image data at the projector, for example.

<Hardware Configuration>

<<Computer>>

Figure 2:
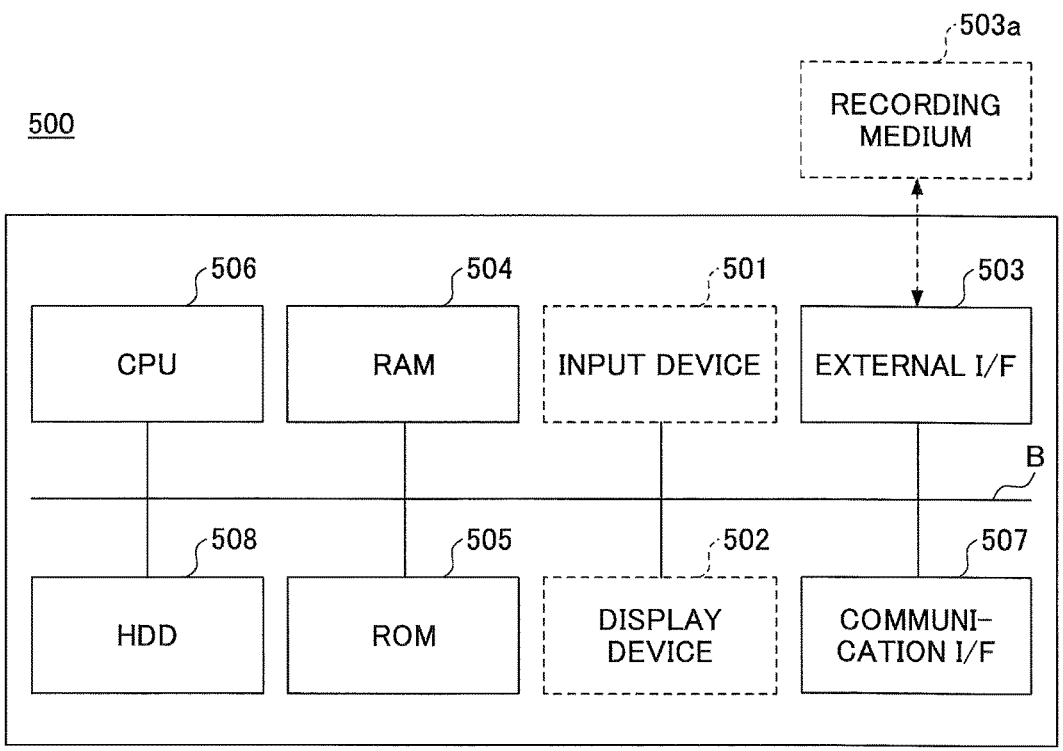
FIG. 2 is a block diagram illustrating an exemplary hardware configuration of a computer according to an embodiment of the present invention.

The information processing apparatus 14 may be implemented by a computer having a hardware configuration as illustrated in FIG. 2, for example. FIG. 2 is a block diagram illustrating an exemplary hardware configuration of a computer 500 according to an embodiment of the present invention.

In FIG. 2, the computer 500 includes an input device 501, a display device 502, an external I/F 503, a RAM 504, a ROM 505, a CPU 506, a communication I/F 507, and a hard disk drive (HDD) 508 that are interconnected via a bus B. Note that in some embodiments, the input device 501 and the display device 502 may be connected to the computer 500 when they need to be used, for example.

The input device 501 may include a keyboard and/or a mouse, for example, and is used to input various operation signals to the computer 500. The display device 502 may include a display, for example, and is configured to display processing results of the computer 500.

The communication I/F 507 is an interface for connecting the computer 500 to various networks. The computer 500 may establish data communication with other computers via the communication I/F 507.

The HDD 508 is a nonvolatile storage device storing programs and data. The programs stored in the HDD 508 may include an operating system (OS) corresponding to basic software controlling overall operations of the computer 500, and application software (also simply referred to as "application" hereinafter) providing various functions under the control of the OS, for example. Note that in some embodiments, the computer 500 may include a drive apparatus such as a solid state drive (SSD) that uses a flash memory as a recording medium instead of the HDD 508.

The external I/F 503 is an interface between the computer 500 and an external device. The external device may be a recording medium 503a, for example. The computer 500 may read information from and/or write information on the recording medium 503a via the external I/F 503. Specific examples of the recording medium 503a include a flexible disk, a compact disk (CD), a digital versatile disk (DVD), a SD memory card, a universal serial bus (USB) memory, and the like.

The ROM 505 is a nonvolatile semiconductor memory (storage device) that can store programs and/or data even when the power is turned off. The ROM 505 may store programs and data such as a basic input/output system (BIOS) to be performed when the computer 500 is started, OS settings, network settings, and the like. The RAM 504 is a volatile semiconductor memory (storage device) that temporarily stores programs and/or data.

The CPU 506 includes computing unit that reads a program and/or data from a storage device such as the ROM 505 and/or the HDD 508, loads the program and/or data in the RAM 504, and executes processes according to the program and/or data to control the overall operations and functions of the computer 500.

The information processing apparatus 14 may implement various processes as described below using the hardware configuration of the computer 500 as illustrated in FIG. 2, for example.

<<Terminal Apparatus>>

Figure 3:
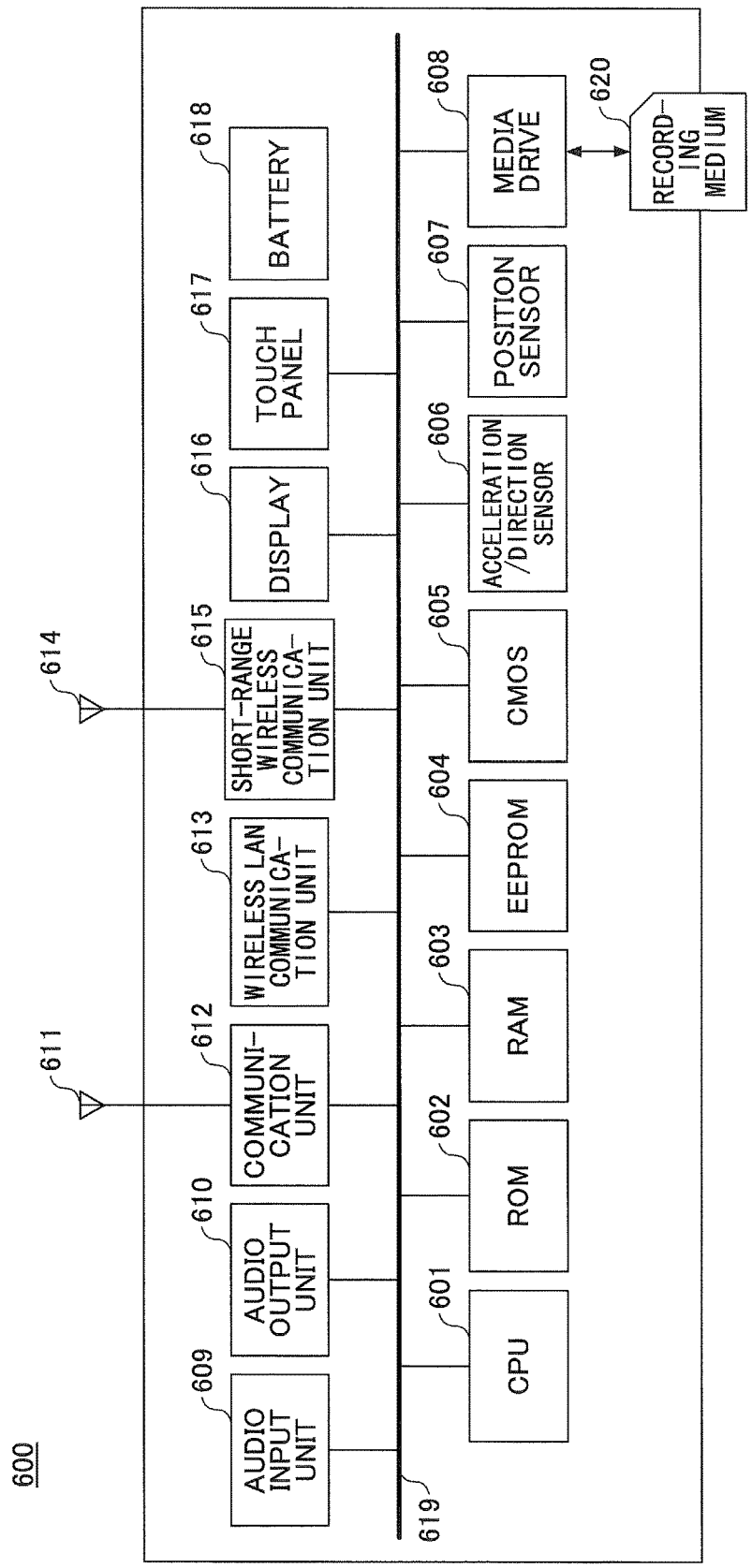
FIG. 3 is a block diagram illustrating an exemplary hardware configuration of a mobile terminal according to an embodiment of the present invention.

The mobile terminal 10 may be implemented by a terminal apparatus 600 having a hardware configuration as illustrated in FIG. 3, for example. FIG. 3 illustrates an exemplary hardware configuration of the terminal apparatus 600 according to the present embodiment. In FIG. 3, the terminal apparatus includes a CPU 601, a ROM 602, a RAM 603, an EEPROM (Electrically Erasable Read Only Memory) 604, a CMOS (complementary metal-oxide semiconductor) sensor 605, an acceleration/direction sensor 606, a position sensor 607, and a media drive 608.

The CPU 601 controls overall operations of the terminal apparatus 600. The ROM 602 stores basic input/output programs. The RAM 603 is used as a work area of the CPU 601. The EEPROM 604 reads and writes data according to control of the CPU 601. The CMOS sensor 605 captures an image of an object and obtains image data of the object according to control by the CPU 601. The acceleration/direction sensor 606 may include an electromagnetic compass or a gyrocompass that detects terrestrial magnetism, and an acceleration sensor, for example. The position sensor 607 may include a GPS (global positioning system) for detecting a position on Earth, for example.

The media drive 608 controls reading/writing (storing) of data with respect to a recording medium 620 such as a flash memory. The recording medium 620 may be detachably loaded into the media drive 608 so that data recorded in the recording medium 620 can be read from the recording medium 620 and/or new data can be written (stored) in the recording medium 620.

The EEPROM 604 may store an OS to be performed by the CPU 601 and required association information for setting up a network, for example. Note that applications for executing various processes according to the present embodiment may be stored in the EEPROM 604 or the recording medium 620, for example.

The CMOS sensor 605 is an image sensor that converts light into an electrical charge to digitize an image of an object. The CMOS sensor 605 is not limited to a CMOS sensor but may be other types of image sensors such as a CCD (Charge Coupled Device) sensor as long as the sensor can capture an image of an object.

In FIG. 3, the terminal apparatus 600 further includes an audio input unit 609, an audio output unit 610, an antenna 611, a communication unit 612, a wireless LAN communication unit 613, a short-range wireless communication antenna 614, a short-range wireless communication unit 615, a display 616, a touch panel 617, and a bus line 619.

The audio input unit 609 converts audio into audio signals. The audio output unit 610 converts audio signals into audio. The communication unit 612 transmits/receives wireless signals to/from a nearest base station using the antenna 611. The wireless LAN communication unit 613 establishes wireless communication with an access point according to the IEEE80411 standard. The short-range wireless communication unit 615 establishes short-range wireless communication using the short-range wireless communication antenna 614.

The display 616 may be a liquid crystal display or an organic electro-luminescence display that displays an image of an object and various icons, for example. The touch panel 617 may be, for example, a pressure sensitive panel or an electrostatic panel arranged on the display 616 that detects a touch position on the display 616 touched by a finger, a pen, or the like, for example. The bus line 619 may be, for example, an address bus or a data bus for electrically connecting the aforementioned parts and components of the terminal apparatus 600.

The terminal apparatus 600 also includes a dedicated battery 618. The terminal apparatus 600 is driven by the battery 618. Note, also, that the audio input unit 609 includes a microphone into which audio is input. The audio output unit 610 includes a speaker from which audio is output.

The mobile terminal 10 of the present embodiment may implement various processes described below using the hardware configuration of the terminal apparatus 600 as illustrated in FIG. 3, for example.

<<Input/Output Apparatus>>

Figure 4:
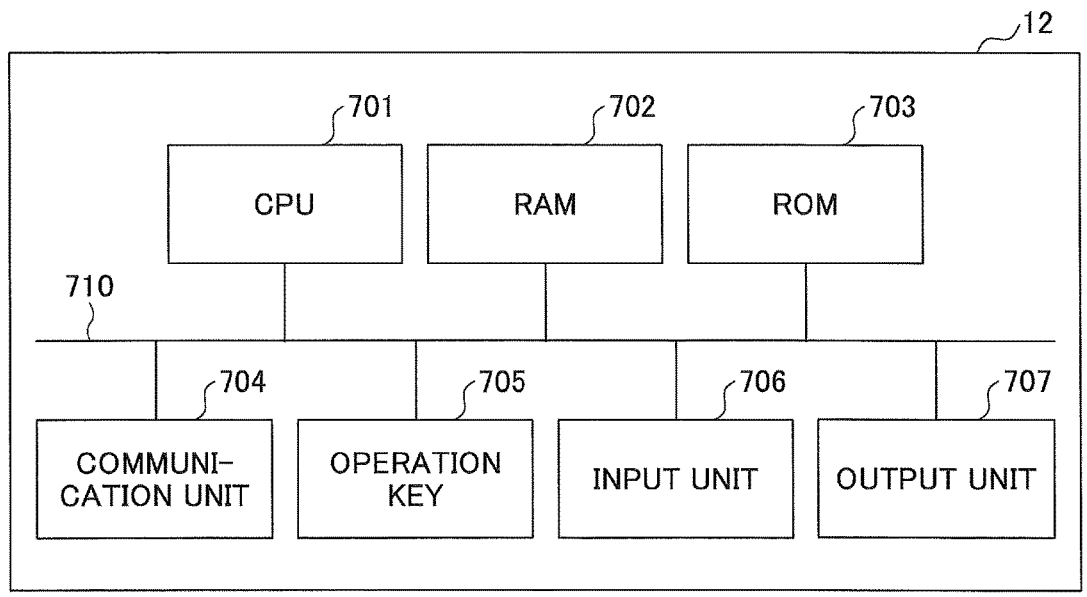
FIG. 4 is a block diagram illustrating an exemplary hardware configuration of an input/output apparatus according to an embodiment of the present invention.

The input/output apparatus 12 may have a hardware configuration as illustrated in FIG. 4, for example. FIG. 4 is a block diagram illustrating an exemplary hardware configuration of the input/output apparatus 12 according to the present embodiment. In FIG. 4, the input/output apparatus 12 includes a CPU 701, a RAM 702, a ROM 703, a communication unit 704, operation keys 705, an input unit 706, an output unit 707, and a bus line 710.

The CPU 701 controls overall operations of the input/output apparatus 12. The RAM 702 is used as a working area of the CPU 701. The ROM 703 may store a basic input/output program and the like.

The communication unit 704 establishes wired or wireless data communication via the network N1. The operation keys 705 may be hard keys or soft keys that are provided by the input/output apparatus 12, for example. The input unit 706 acquires (inputs) a target file in response to an input request. For example, in response to a scan request, the input unit 706 may scan an original document and acquire image data of the original document.

The output unit 707 outputs a target file to be output in response to an output request. For example, the output unit 707 may print, project, or display the target file in response to a print request, an image projection request, or an image display request, for example.

<Software Configuration>

<<Mobile Terminal>>

Figure 5:
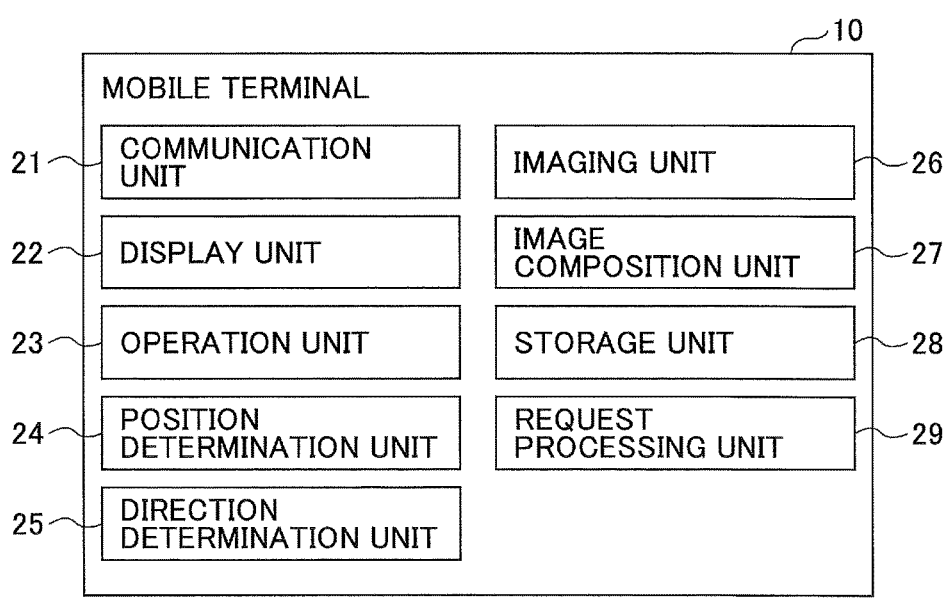
FIG. 5 is a block diagram illustrating an exemplary functional configuration of a mobile terminal according to an embodiment of the present invention.

The mobile terminal 10 according to the present embodiment may have a functional configuration as illustrated in FIG. 5, for example. FIG. 5 is a block diagram illustrating an exemplary functional configuration of the mobile terminal 10. In FIG. 5, the mobile terminal 10 includes a communication unit 21, a display unit 22, an operation unit 23, a position determination unit 24, a direction determination unit 25, an imaging unit 26, an image composition unit 27, a storage unit 28, and a request processing unit 29 that may be implemented by installing and executing a relevant program, for example.

The communication unit 21 establishes communication with the input/output apparatus 12 and the information processing apparatus 14 via the network N1. The display unit 22 displays a UI (user interface) to the user. The operation unit 23 accepts user operations. The position determination unit 24 determines the position of the mobile terminal 10 or the input/output apparatus 12. The direction determination unit 25 determines the imaging direction of the imaging unit 26.

The imaging unit 26 captures an image in a direction to which a camera (CMOS sensor 605) is directed. The image composition unit 27 composites information onto the image captured by the imaging unit 26 as described below. The storage unit 28 stores communication results and the like. The request processing unit 29 may transmit a request to the input/output apparatus 12 or the information processing apparatus 14 and receive a processing result of the request, for example.

<<Input/Output Apparatus>>

In the following, functional configurations of an MFP 12*m*, a projector 12*p*, and an IWB 12*i* as examples of the input/output apparatus 12 according to the present embodiment are described.

Figure 6:
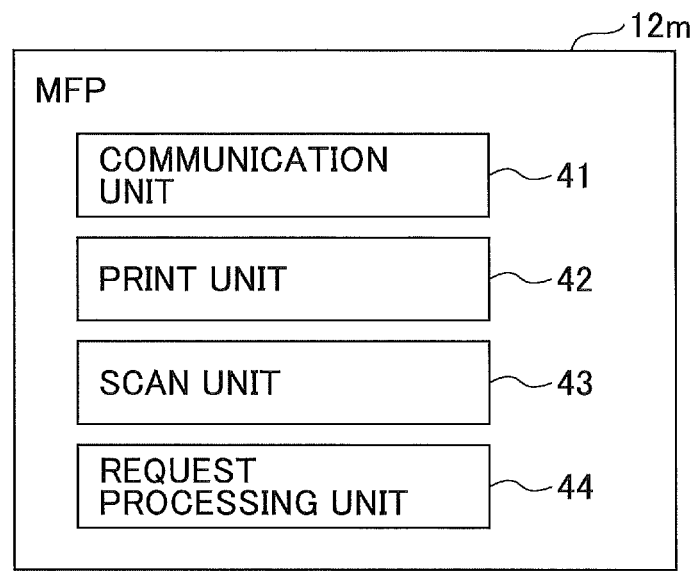
FIG. 6 is a block diagram illustrating an exemplary functional configuration of a multifunction peripheral.

The MFP 12*m* may have a functional configuration as illustrated in FIG. 6, for example. FIG. 6 is a block diagram illustrating an exemplary functional configuration of the MFP 12*m*. In FIG. 6, the MFP 12*m* includes a communication unit 41, a print unit 42, a scan unit 43, and a request processing unit 44 that may be implemented by executing a relevant program, for example.

The communication unit 41 communicates with the mobile terminal 10 via the network N1. The print unit 42 prints print data on a printing medium such as paper. The scan unit 43 scans a document to acquire image data of the document. Also, the request processing unit 44 may receive a request from the mobile terminal 10, or transmit a processing result of the request, for example.

Figure 7:
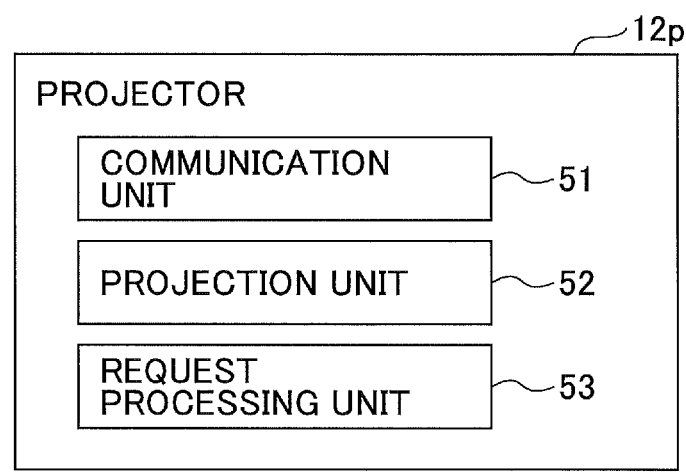
FIG. 7 is a block diagram illustrating an exemplary functional configuration of a projector.

The projector 12*p* may have a functional configuration as illustrated in FIG. 7. FIG. 7 is a block diagram illustrating an exemplary functional configuration of the projector 12*p*. The projector 12*p* includes a communication unit 51, a projection unit 52, and a request processing unit 53 that may be implemented by executing a relevant program, for example.

The communication unit 51 communicates with the mobile terminal 10 via the network N1. The projection unit 52 projects image data and application data. Also, the request processing unit 53 may receive a request from the mobile terminal 10, or transmit a processing result of the request, for example.

Figure 8:
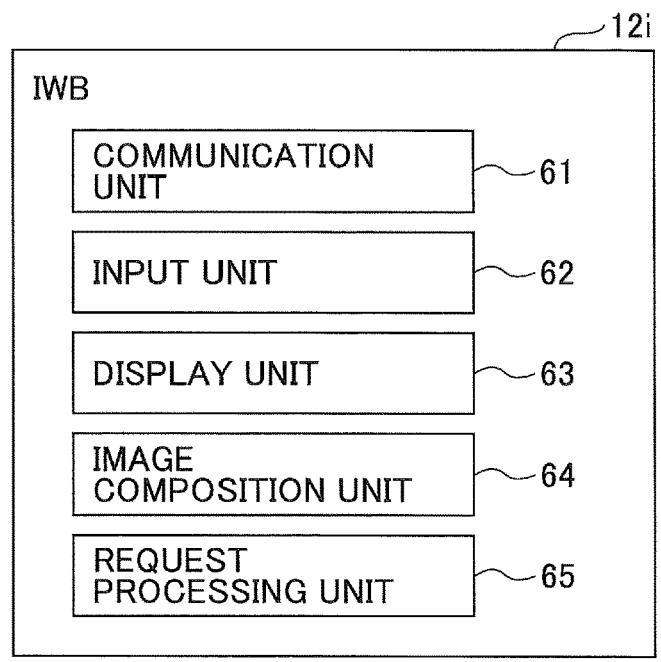
FIG. 8 is a block diagram illustrating an exemplary functional configuration of an interactive whiteboard.

The IWB 12*i* may have a functional configuration as illustrated in FIG. 8, for example. FIG. 8 is a block diagram illustrating an exemplary functional configuration of the IWB 12*i*. In FIG. 8, the IWB 12*i* includes a communication unit 61, an input unit 62, a display unit 63, an image composition unit 64, and a request processing unit 65 that may be implemented by executing a relevant program, for example.

The communication unit 61 communicates with the mobile terminal 10 via the network N1. The input unit 62 accepts an input such as that made by a touch pen, for example. The display unit 63 may display image data and application data, for example. Also, the request processing unit 65 may receive a request from the mobile terminal 10, or transmit a processing result of the request, for example.

<<Information Processing Apparatus>>

Figure 9:
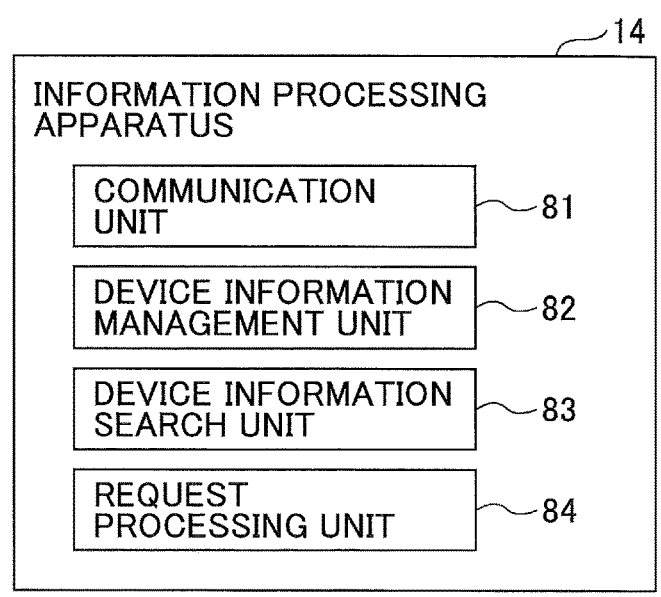
FIG. 9 is a block diagram illustrating an exemplary functional configuration of an information processing apparatus according to an embodiment of the present invention.

The information processing apparatus 14 may have a functional configuration as illustrated in FIG. 9, for example. FIG. 9 is a block diagram illustrating an exemplary functional configuration of the information processing apparatus 14 according to the present embodiment. In FIG. 9, the information processing apparatus 14 includes a communication unit 81, a device information management unit 82, a device information search unit 83, and a request processing unit 84 that may be implemented by executing a relevant program, for example.

The communication unit 81 communicates with the mobile terminal 10 via the network N1. The device information management unit 82 manages device information as described below. The device information search unit 83 searches for device information that satisfies a condition from the device information managed by the device information management unit 82 as described below. Also, the request processing unit 84 may receive a request from the mobile terminal 10, or transmit a processing result of the request, for example.

FIG. 10 is a table illustrating an exemplary configuration of device information managed by the information processing apparatus 14. The device information of FIG. 10 includes a device name, a latitude, a longitude, an altitude, an IP address, an input function, and an output function as data items. The device name is an example of identification information for identifying the input/output apparatus 12 such as the name of the input/output apparatus 12. The latitude, the longitude, and the altitude are examples of position information indicating the position of the input/output apparatus 12. The IP address is an example of connection information for establishing connection with the input/output apparatus 12 via the network N1.

The input function is information indicating whether the input/output apparatus 12 includes an input function. For example, the value "YES" may be set up if the input/output apparatus 12 includes an input function, and the value "NO" may be set up if the input/output apparatus 12 does not include an input function. The output function is information indicating whether the input/output apparatus 12 includes an output function. For example, the value "YES" may be set up if the input/output apparatus 12 includes an output function, and the value "NO" may be set up if the input/output apparatus 12 does not include an output function.

The mobile terminal 10 may make a request for device information to the information processing apparatus 14, and acquire the device information as illustrated in FIG. 10 as a processing result of the request, for example.

<Process Operations>

In the following, process operations of the input/output system 1 of the present embodiment are described in greater detail.

Figure 11:
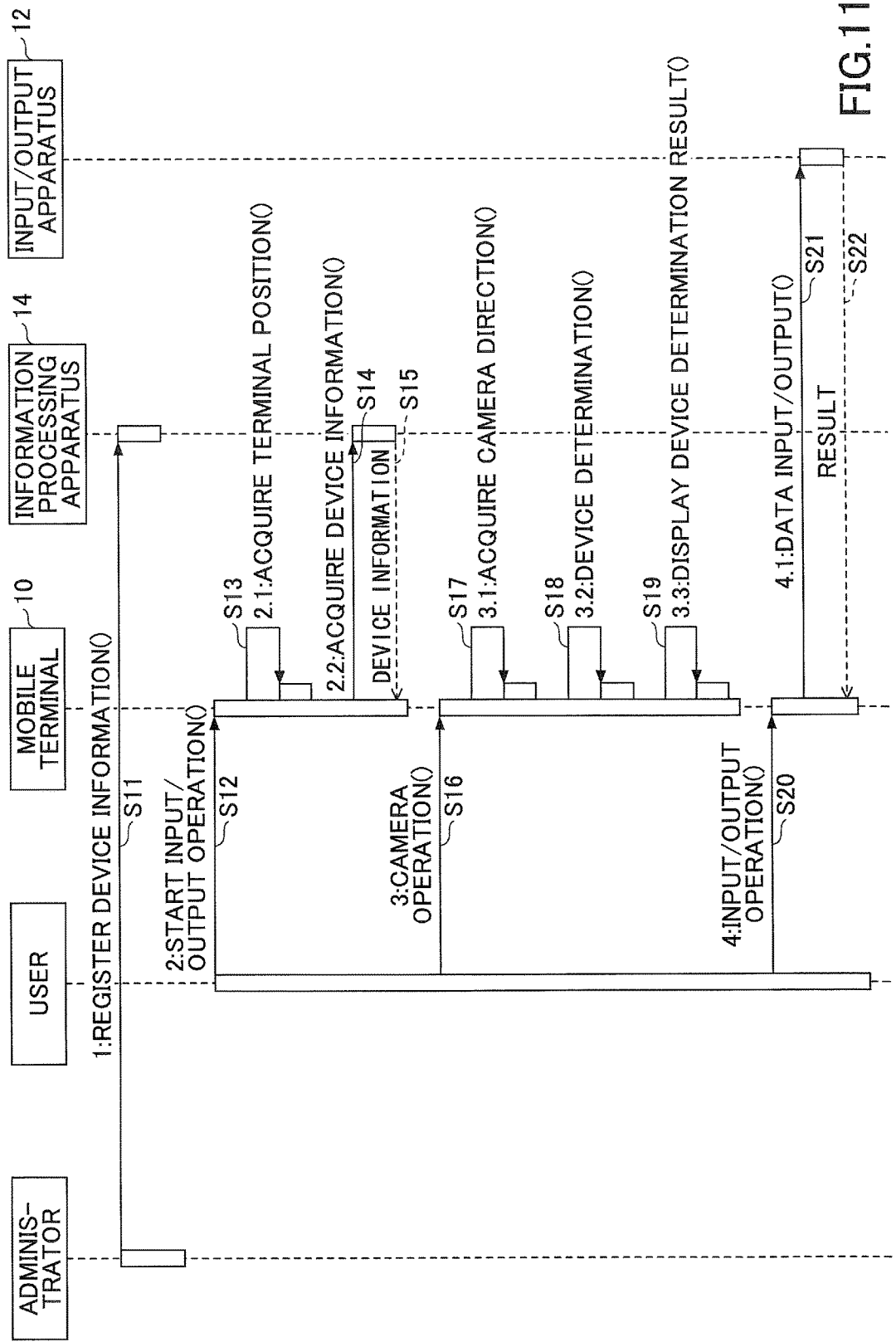
FIG. 11 is a sequence chart illustrating an exemplary process of the input/output system according to an embodiment of the present invention.

In the input/output system 1 of FIG. 1, the mobile terminal 10 may designate an operation to be performed by the input/output apparatus 12 through process operations as illustrated in FIG. 11, for example. FIG. 11 is a sequence chart illustrating an exemplary process of the input/output system 1 according to the present embodiment.

In step S11, an administrator registers device information such as that illustrated in FIG. 10 in the information processing apparatus 14. The device information management unit 82 of the information processing unit 14 manages the device information registered by the administrator.

In step S12, a user starts an input/output operation with respect to the mobile terminal 10 to designate an operation to be performed by the input/output apparatus 12. When the user starts the input/output operation, in step S13, the position determination unit 24 of the mobile terminal 10 determines the position of the mobile terminal 10.

In step S14, the request processing unit 29 of the mobile terminal 10 transmits an acquisition request for acquiring device information to the information processing apparatus 14. In step S15, the request processing unit 29 of the mobile terminal 10 acquires the device information such as that illustrated in FIG. 10 from the information processing apparatus 14.

In step S16, the user operates a camera of the mobile terminal 10. Upon accepting an operation of the camera by the user, the imaging unit 26 of the mobile terminal 10 captures an image in a direction to which the camera is directed. Also, in step S17, the direction determination unit 25 of the mobile terminal 10 determines the direction of the camera.

In step S18, the image composition unit 27 determines whether an image of the input/output apparatus 12 is included in the image captured by the camera based on the position of the mobile terminal 10 determined by the position determination unit 24, the direction of the camera determined by the direction determination unit 25, and the acquired device information.

If it determined that an image of the input/output apparatus 12 is included in the image captured by the camera, in step S19, the image composition unit 27 composites information (input/output assist line) as described below onto the image captured by the camera, and prompts the display unit 22 to display an identification result of the input/output apparatus 12. Note that the information (input/output assist line) composited onto the image captured by the camera is described in detail below.

In step S20, the user performs an operation such as flicking (described below) with respect to information (input/output assist line) composited onto the image captured by the camera, and in this way, the user designates an operation to be performed by the input/output apparatus 12.

In step S21, the request processing unit 29 of the mobile terminal 10 transmits to the input/output apparatus 12 an operation request for the operation (data input/output) to be performed by the input/output apparatus 12 according to the designation operation by the user. Upon receiving the operation request from the mobile terminal 10, the input/output apparatus 12 performs a data input/output process such as printing, image projection, image display, or scanning according to the operation request. In step S22, the request processing unit 29 of the mobile terminal 10 receives the processing result of the operation request transmitted in step S21.

Figure 12:
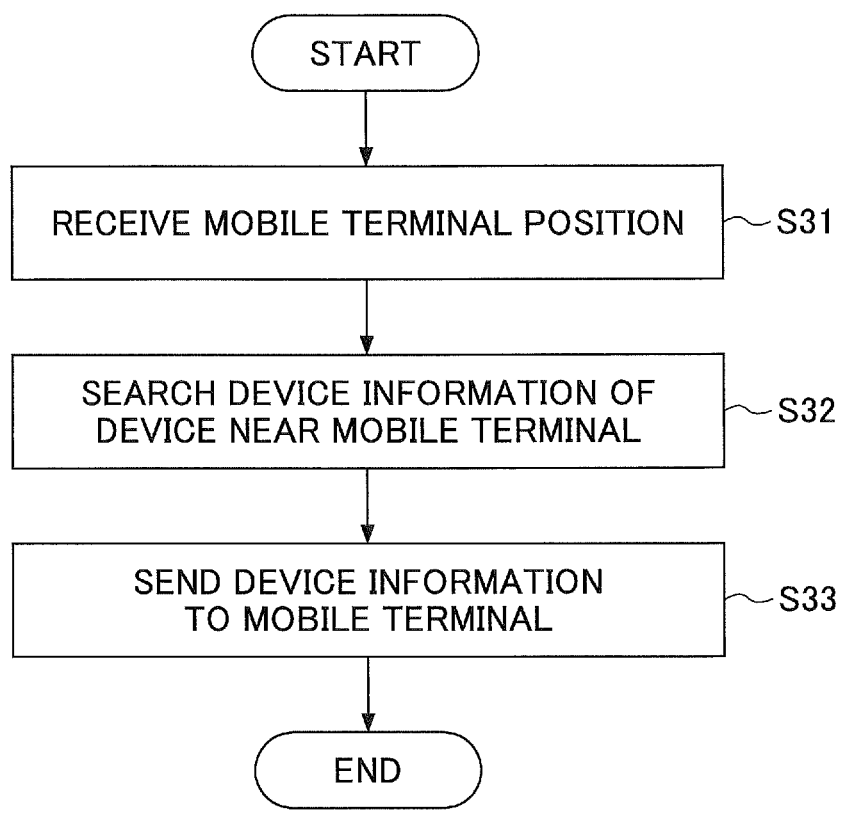
FIG. 12 is a flowchart illustrating an exemplary process executed in response to a device information acquisition request.

The information processing apparatus 14 that has received the device information acquisition request from the mobile terminal 10 in step S14 may transmit the requested device information to the mobile terminal 10 by performing process operations as illustrated in FIG. 12, for example. FIG. 12 is a flowchart illustrating an exemplary process performed in response to a device information acquisition request.

In step S31, the request processing unit 84 of the information processing unit 14 receives position information indicating the position of the mobile terminal 10 that is included in the device information acquisition request. In step S32, the device information search unit 83 of the information processing apparatus 14 searches for device information of the input/output apparatus 12 near (within a predetermined distance from) the mobile terminal 10 based on the position of the mobile terminal 10 and position information of the device information managed by the device information management unit 82. In step S33, the request processing unit 84 of the information processing apparatus 14 transmits to the mobile terminal 10 the device information of the input/output apparatus 12 near the mobile terminal 10 as a processing result of the device information acquisition request.

By performing the process as illustrated in FIG. 12 in response to a device information acquisition request, the device information that is transmitted to the mobile terminal 10 may be limited to device information of the input/output apparatus 12 near the mobile terminal 10, and in this way, the communication time and processing load of the mobile terminal 10 may be reduced, for example.

Also, in the process as illustrated in FIG. 12 that is performed in response to a device information acquisition request, after searching for the device information of the input/output apparatus 12 that is near the mobile terminal 10 in step S32, the search may be further confined to device information of a connectable input/output apparatus 12. Confining the search to a connectable input/output apparatus 12 may be implemented using a ping specifying the IP address included in the device information of each input/output apparatus 12 that is near the mobile terminal 10, for example.

Figure 13:
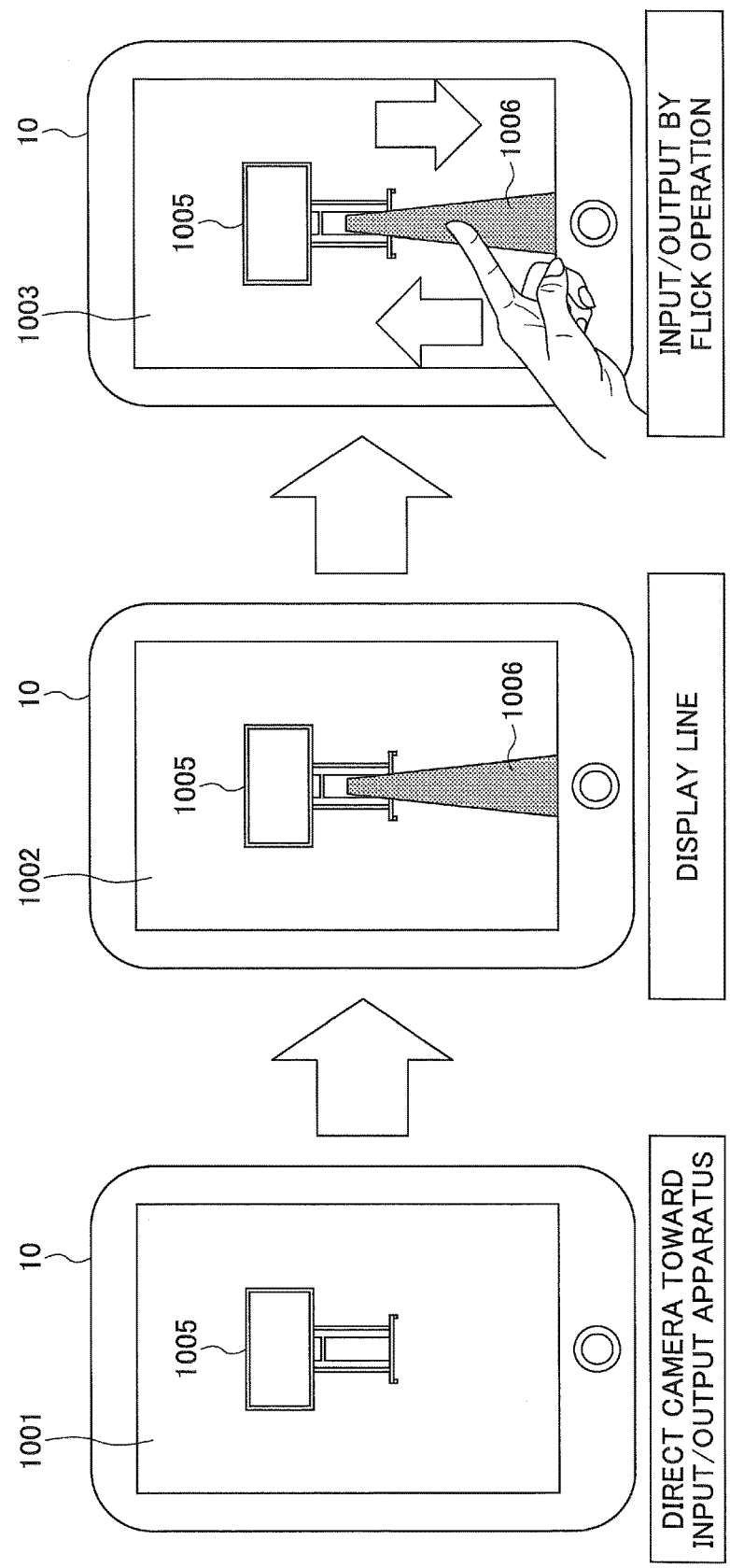
FIG. 13 illustrates an exemplary sequence of screen transitions of the mobile terminal in conjunction with user operations.

During the sequence of processes as illustrated in FIG. 11, a screen displayed by the mobile terminal 10 having its camera directed toward the input/output apparatus 12 may change in response to user operations as illustrated in FIG. 13, for example. FIG. 13 illustrates an exemplary sequence of screen transitions of the mobile terminal 10 in conjunction with user operations.

In step S16 of FIG. 11, the mobile terminal 10 having its camera directed toward the input/output apparatus 12 may display a screen 1001 as illustrated in FIG. 13, for example. The screen 1001 includes an image 1005 of the IWB 12$i$ as an example of the input/output apparatus 12.

In steps S17 to S19 of FIG. 11, the mobile terminal 10 may display a screen 1002 as illustrated in FIG. 13. That is, because the image 1005 of the IWB 12$i$ is included in the screen 10001 corresponding to the image captured by the camera, a line 1006 may be composited onto the screen 1001 to generate and display the screen 1002. The line 1006 is an example of an input/output assist line.

For example, the user may perform a flick operation along the line 1006 in a direction from the lower side of a screen 1003 toward the image 1005 of the IWB 12$i$ as illustrated in FIG. 13, and in this way, the user may designate an operation for transmitting data such as image data from the mobile terminal 10 to the IWB 12$i$.

Also, the user may perform a flick operation along the line 1006 in a direction from the image 1005 of the IWB 12$i$ toward the lower side of the screen 1003 as illustrated in FIG. 13, and in this way, the user may designate an operation for transmitting data such as image data from the IWB 12$i$ to the mobile terminal 10.

As illustrated in FIG. 13, the mobile terminal 10 according to the present embodiment composites the line 1006 corresponding to an input/output assist line onto the screen 1001 so that the line 1006 extends from the image 1005 of the IWB 12$i$ included in the image captured by the camera toward the outer side (lower side in FIG. 13) of the screen 1002.

Upon accepting an operation (flick operation) of the user tracing the line 1006 in a direction from the outer side (lower side in FIG. 13) of the screen 1002 toward the image 1005 of the IWB 12$i$, the mobile terminal 10 of the present embodiment transmits data such as image data to the IWB 12$i$ and prompts the IWB 12$i$ to display the data.

Upon accepting an operation (flick operation) of the user tracing the line 1006 in a direction away from the image 1005 of the IWB 12$i$ toward the outer side (lower side in FIG. 13) of the screen 1002, the mobile terminal 10 of the present embodiment prompts the IWB 12$i$ to transmit image data or the like displayed at the IWB 12$i$ to the mobile terminal 10.

As can be appreciated from the above, in the input/output system 1 according to the present embodiment, an operation to be performed by the input/output apparatus 12 may be designated through simple and intuitive operations such as tracing the line 1006 in a direction away from the image 1005 of the IWB 12$i$ displayed on a user interface (UI) screen of the mobile terminal 10 (toward the outer side of the screen 1002), or in a direction toward the image 1005 of the IWB 12i displayed on a user interface (UI) screen, for example.

Second Embodiment

In the following, the input/output system 1 according to a second embodiment of the present invention is described. In the input/output system 1 according to the first embodiment, the line 1006 as an input/output assist line is composited onto an image captured by the camera. In the input/output system 1 according to the second embodiment, instead of compositing the line 1006, an arrow is composited onto the image captured by the camera as an input/output assist line. Note that descriptions of features of the input/output system 1 according to the second embodiment that are substantially identical to those of the input/output system 1 according to the first embodiment are omitted.

Figure 14:
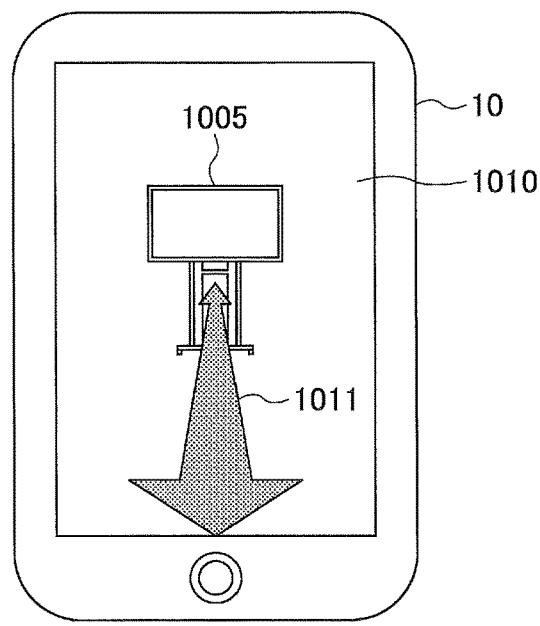
FIG. 14 illustrates an exemplary screen displaying an arrow as an input/output assist line.

FIG. 14 illustrates an exemplary screen including an arrow as an input/output assist line. In FIG. 14, an arrow 1011 as an input/output assist line is composited onto a screen 1010 displaying an image captured by the camera.

The arrow 1011 of FIG. 14 is a double arrow indicating that the mobile terminal 10 can accept both a flick operation along the arrow 1011 in a direction from the lower side of the screen 1010 toward the image 1005 of the IWB 12i and a flick operation from the image 1005 of the IWB 12i toward the lower side of the screen 1010.

Figure 15:
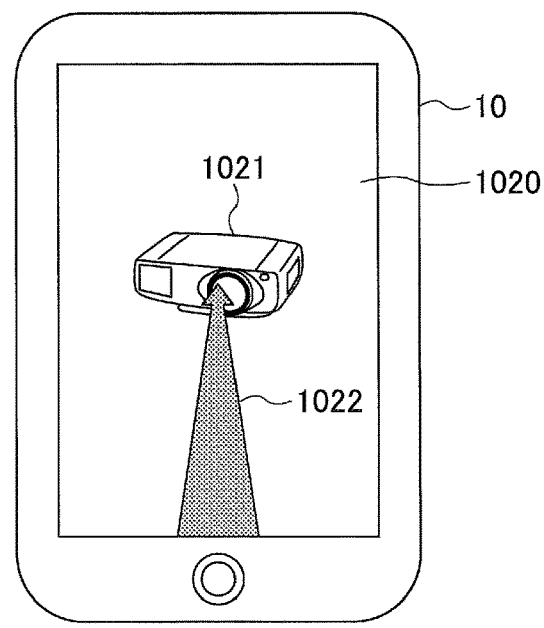
FIG. 15 illustrates another exemplary screen displaying an arrow as an input/output assist line.

FIG. 15 illustrates another exemplary screen including an arrow as an input/output assist line. In FIG. 15, an arrow 1022 as an input/output assist line is composited onto a screen 1020 displaying an image captured by the camera. The arrow 1022 of FIG. 15 is a single arrow indicating that the mobile terminal 10 can accept a flick operation along the arrow 1022 in a direction from the lower side of the screen 1020 toward an image 1021 of the projector 12p. Note that the projector 12p is an example of an input/output apparatus 12 that is capable of outputting data such as image data received from the mobile terminal 10.

Figure 16:
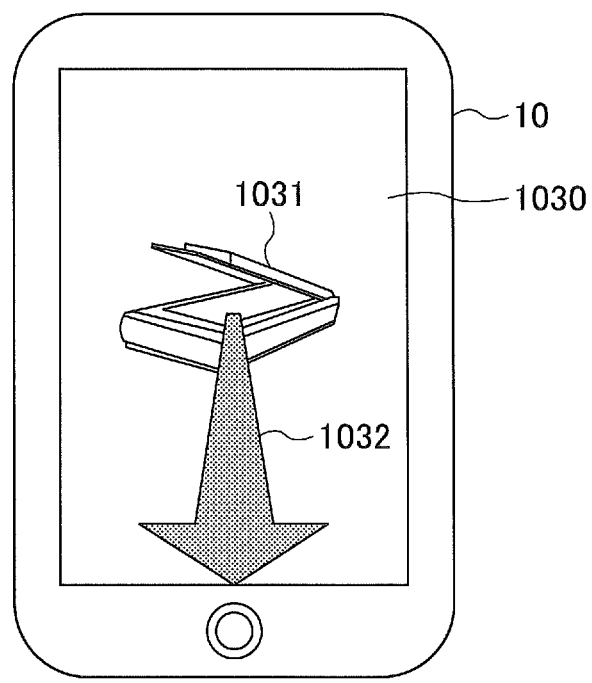
FIG. 16 illustrates another exemplary screen displaying an arrow as an input/output assist line.

FIG. 16 illustrates another exemplary screen including an arrow as an input/output assist line. In FIG. 16, an arrow 1032 as an input/output assist line is composited onto a screen 1030 displaying an image captured by the camera. The arrow 1032 of FIG. 16 is a single arrow indicating that the mobile terminal 10 can accept a flick operation along the arrow 1032 in a direction from an image 1031 of a scanner toward the lower side of the screen 1030. The scanner is an example of an input/output apparatus 12 that is capable of outputting data such as image data to the mobile terminal 10.

Figure 17:
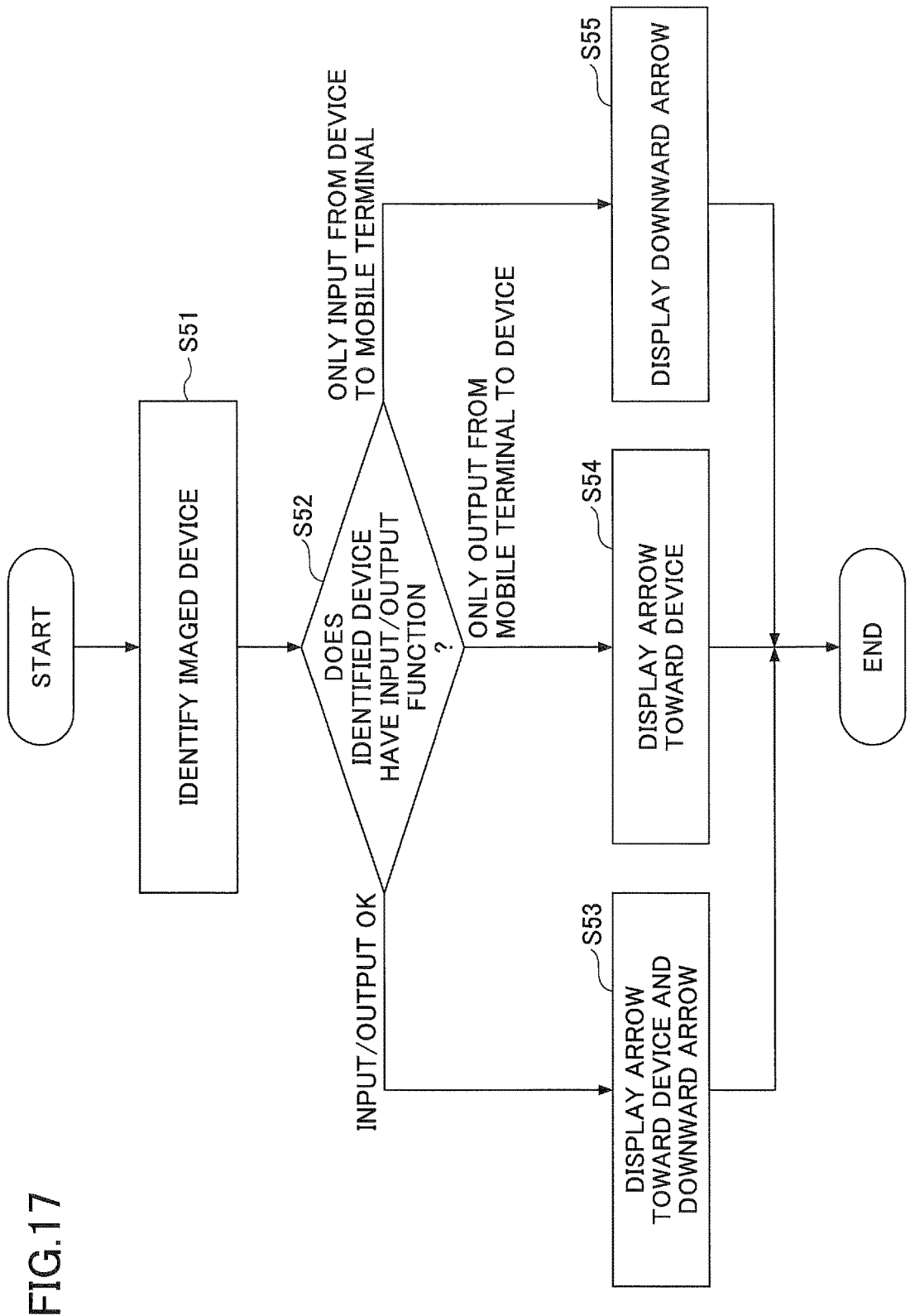
FIG. 17 is a flowchart illustrating an exemplary process for compositing an arrow onto an image captured by a camera.

In the case of compositing an arrow corresponding to an input/output assist line onto an image captured by the camera, the image composition unit 27 of the mobile terminal 10 may perform a process as illustrated in FIG. 17 during steps S18 and S19 of FIG. 11, for example. FIG. 17 is a flowchart illustrating an exemplary process of compositing an arrow onto an image captured by the camera.

In step S51, the image composition unit 27 of the mobile terminal 10 identifies the input/output apparatus 12 included in the image captured by the camera based on the position of the mobile terminal 10, the direction of the camera, and the acquired device information.

In step S52, the image composition unit 27 determines the input/output functions that can be implemented by the input/output apparatus 12 identified in step S51 based on the input/output function information included in the device information of the identified input/output apparatus 12.

If the identified input/output apparatus 12 is capable of implementing both input and output functions, in step S53, the image composition unit 27 may display a double arrow such as the arrow 1011 illustrated in FIG. 14 pointing in a downward direction away from the input/output apparatus 12 and an upward direction toward the input/output apparatus 12, for example.

If the identified input/output apparatus 12 is capable of implementing an output function but not an input function, in step S54, the image composition unit 27 may display a single arrow such as the arrow 1022 illustrated in FIG. 15 pointing in an upward direction toward the input/output apparatus 12. If the identified input/output apparatus 12 is capable of implementing an input function but not an output function, in step S55, the image composition unit 27 may display a single arrow such as the arrow 1032 illustrated in FIG. 16 pointing in a downward direction away from the input/output apparatus 12, for example.

In the input/output system 1 according to the second embodiment, the user can intuitively recognize the input/output functions that can be implemented by the input/output apparatus 12 based on the arrow displayed in the screen of the mobile terminal 10.

Third Embodiment

In the following, the input/output system 1 according to a third embodiment of the present invention is described. In the input/output system 1 according to the first and second embodiments, one input/output assist line is composited onto an image captured by the camera. In the input/output system 1 according to the third embodiment, additional information may be composited onto the image captured by the camera in addition to the input/output assist line. Note that descriptions of features of the input/output system 1 according to the third embodiment that are substantially identical to those of the input/output system 1 according to the first or second embodiment are omitted.

Figure 18:
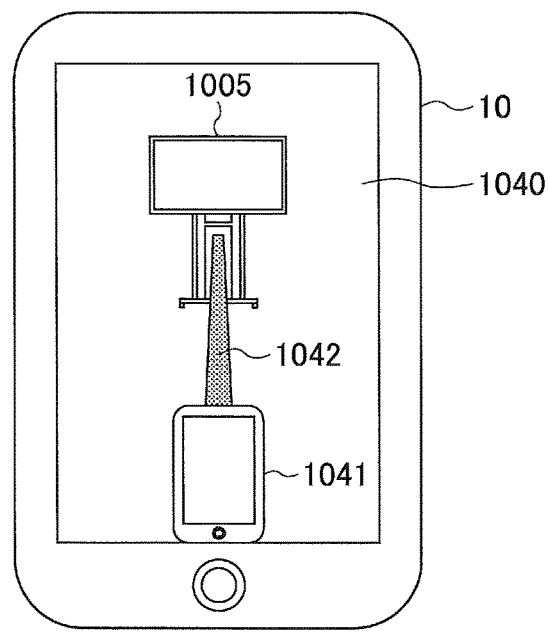
FIG. 18 illustrates an exemplary screen displaying an input/output assist line and an image of the mobile terminal.

FIG. 18 illustrates an exemplary screen displaying an input/output assist line and an image 1041 of the mobile terminal 10. In FIG. 18, the image 1041 of the mobile terminal 10 and a line 1042 corresponding to an input/output assist line is composited onto a screen 1040 displaying the image 1005 of the IWB 12i. The image 1041 of the mobile terminal 10 may be a computer graphic (CG) image or a previously-captured image of the mobile terminal 10 that has been prepared in advance, for example.

As illustrated in the screen 1040 of FIG. 18, the line 1042 is arranged to interconnect the image 1005 of the IWB 12i and the image 1041 of the mobile terminal 10. The user may perform a flick operation along the line 1042 in a direction from the image 1041 of the mobile terminal 10 toward the image 1005 of the IWB 12i. In this way, the user may be able to more intuitively recognize the flick operation as that for designating the operation for transmitting data such as image data from the mobile terminal 10 to the IWB 12i and prompting the IWB 12i to display the data, for example.

Also, the user may perform a flick operation along the line 1042 in a direction from the image 1005 of the IWB 12i toward the image 1041 of the mobile terminal 10. In this way, the user may be able to more intuitively recognize the flick operation as that for designating the operation for transmitting data such as image data from the IWB 12i to the mobile terminal 10.

Figure 19:
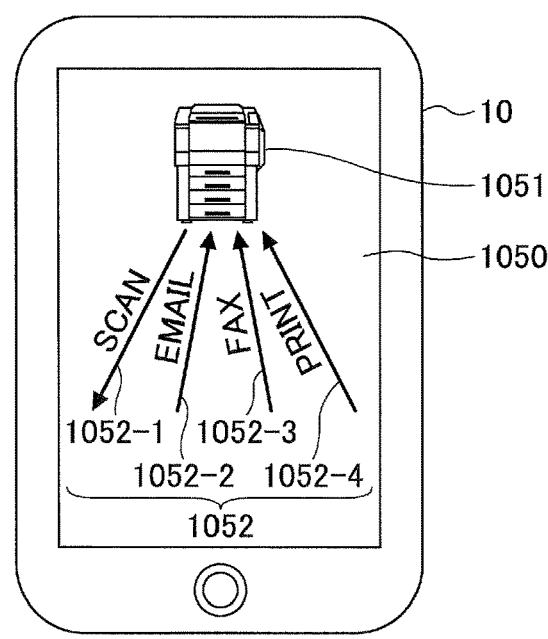
FIG. 19 illustrates an exemplary screen displaying multiple input/output assist lines.

FIG. 19 illustrates an exemplary screen displaying multiple input/output assist lines. In FIG. 19, a plurality of arrows 1052 (arrows 1052-1 to 1052-4) as input/output assist lines are composited onto a screen 1050 displaying an image 1051 of the MFP 12*m*. As illustrated in the screen 1050 of FIG. 19, the arrows 1052 composited onto the screen 1050 each correspond to the input functions and the output functions of the MFP 12*m*.

The arrow 1052-1 is for using the scan function of the MFP 12*m*. The arrow 1052-1 indicates that data such as image data may be input from the MFP 12*m* to the mobile terminal 10 by performing a flick operation along the arrow 1052-1 in a direction from the image 1051 of the MFP 12*m* toward the lower side of the screen 1050.

The arrow 1052-2 is for using the mail function of the MFP 12*m*. The arrow 1052-2 indicates that data such as image data may be transmitted by email from the mobile terminal 10 to the MFP 12*m* by performing a flick operation along the arrow 1052-2 in a direction from the lower side of the screen 1050 toward the image 1051 of the MFP 12*m*.

The arrow 1052-3 is for using the FAX function of the MFP 12*m*. The arrow 1052-3 indicates that data such as image data may be transmitted from the mobile terminal 10 to the MFP 12*m* by facsimile transmission by performing a flick operation along the arrow 1052-3 in the direction from the lower side of the screen 1050 toward the image 1051 of the MFP 12*m*.

The arrow 1052-4 is for using the print function of the MFP 12*m*. The arrow 1052-4 indicates that data such as image data transmitted from the mobile terminal 10 to the MFP 12*m* may be printed at the MFP 12*m* by performing a flick operation along the arrow 1052-4 in the direction from the lower side of the screen 1050 toward the image 1051 of the MFP 12*m*.

Figures 20, 21:
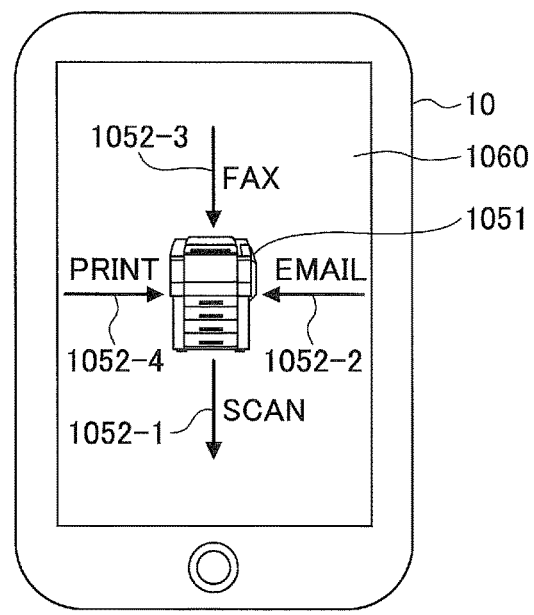
FIG. 20 illustrates another exemplary screen displaying multiple input/output assist lines.
FIG. 21 is a table illustrating an example of function information indicating the functions of each device.

Note that the display positions of the arrows 1052 composited onto the screen 1050 in FIG. 19 is merely an illustrative example, and in another example, the arrows 1052 corresponding to input/output assist lines may be displayed in a manner as illustrated in FIG. 20. FIG. 20 illustrates another exemplary screen 1060 including multiple input/output assist lines.

In the screen 1060 of FIG. 20, the positions of the arrows 1052-1 to 1052-4 of the screen 1050 of FIG. 19 are rearranged to be positioned above, below, to the left, and to the right of the image 1051 of the MFP 12*m*. Because the arrows 1052-1 to 1052-4 in the screen 1060 of FIG. 20 are spread apart as compared with the screen 1050 of FIG. 19, flick operations with respect to the arrows 1052-1 to 1052-4 may be facilitated.

For example, in FIG. 20, image data transmitted from the mobile terminal 10 to the MFP 12*m* may be printed at the MFP 12*m* by performing a flick operation along the arrow 1052-4 in a direction from the left side of the screen 1060 toward the image 1051 of the MFP 12*m*.

To display the screen 1050 of FIG. 19 or the screen 1060 of FIG. 20, for example, function information of each device as illustrated in FIG. 21, may be required. FIG. 21 is a table illustrating an exemplary configuration of function information indicating the functions of each device. The function information of FIG. 21 has input functions and output functions of each input/output apparatus 12 registered in association with the corresponding input/output apparatus 12. For example, in the function information of FIG. 21, "SCAN" is registered as the input function of the input/output apparatus 12 with the device name "MFP1", and "PRINT", "EMAIL", and "FAX" are registered as output functions of the input/output apparatus 12 with the device name "MFP1".

In the input/output system 1 according to the present embodiment, the user may designate one function to be implemented by the input/output apparatus 12 from a plurality of functions that can be implemented by the input/output apparatus 12 through simple and intuitive operations.

Fourth Embodiment

In the following, the input/output system 1 according to a fourth embodiment of the present invention is described. In the input/output system 1 according to the first to third embodiments, an input/output assist line is composited onto an image captured by the camera of the mobile terminal 10, and an operation to be performed by the input/output apparatus 12 can be designated by an operation of the user tracing (flicking) the input/output assist line.

In the input/output system 1 according to the fourth embodiment, after the user designates an operation to be performed by the input/output apparatus 12 by performing an operation of tracing (flicking) an input/output assist line, the user is promoted to specify required settings.

Figure 22:
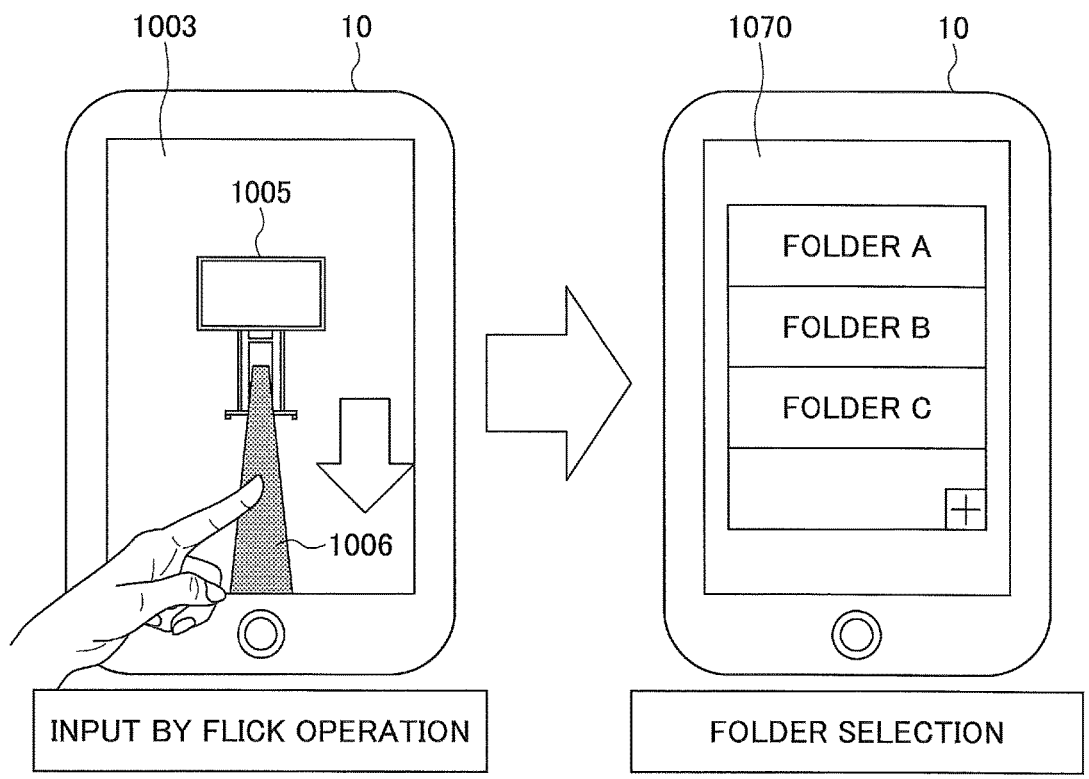
FIG. 22 illustrates another exemplary sequence of screen transitions of the mobile terminal in conjunction with user operations.

FIG. 22 illustrates an exemplary sequence of screen transitions of the mobile terminal 10 in conjunction with user operations. The left side image of FIG. 22 illustrates an exemplary case where the user performs a flick operation along the line 1006 in a direction from the image 1005 of the IWB 12*i* toward the lower side of the screen 1003.

Upon accepting the flick operation along the line 1006 in a direction from the image 1005 of the IWB 12*i* to the lower side of the screen 1003, the screen displayed by the mobile terminal 10 changes to a screen 1070 illustrated on the right side of FIG. 22. The screen 1070 of FIG. 22 is for prompting the user to select a storage destination of data such as image data within the mobile terminal 10.

As described above, in the input/output system 1 according to the fourth embodiment, after the user designates an operation to be performed by the input/output apparatus 12 by performing an operation of tracing (flicking) an input/output assist line included in a screen displayed by the mobile terminal 10, the user may be able to select a storage destination of data such as image data within the mobile terminal 10.

Figure 23:
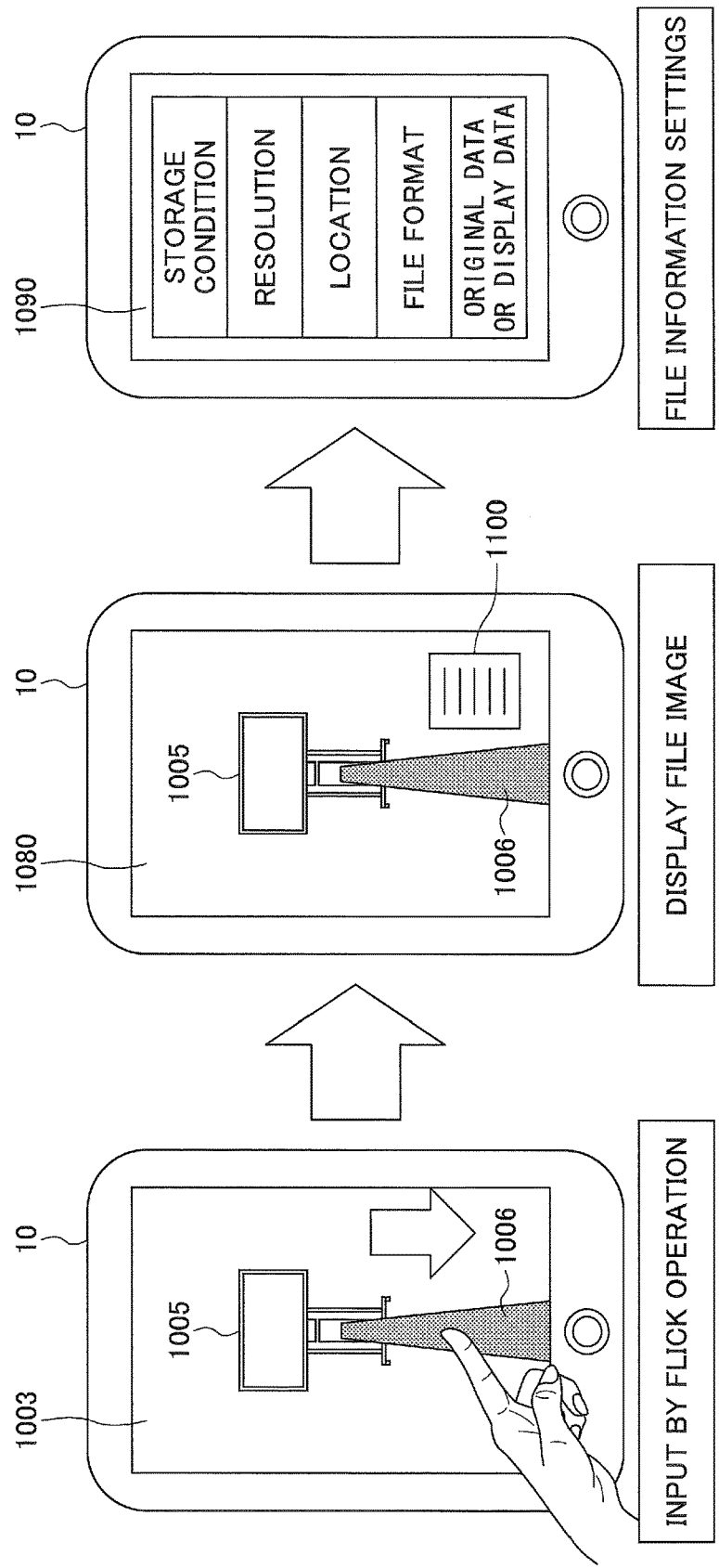
FIG. 23 illustrates another exemplary sequence of screen transitions of the mobile terminal in conjunction with user operations.

FIG. 23 illustrates another exemplary sequence of screen transitions of the mobile terminal 10 in conjunction with the user operations. The left side image of FIG. 23 illustrates an exemplary case where the user performs a flick operation along the line 1006 in a direction from the image 1005 of the IWB 12*i* toward the lower side of the screen 1003.

Upon accepting the flick operation along the line 1006 in the direction from the image 1005 of the IWB 12*i* toward the lower side of the screen 1003, the mobile terminal 10 may change its screen display from the screen 1003 to a screen 1080 including a file image 1100 as illustrated in the middle of FIG. 23. Further, when the user touches the file image 1100 displayed in the screen 1080, for example, the mobile terminal 10 may change its screen display to a screen 1090 as illustrated on the right side of FIG. 23.

The screen 1090 of FIG. 23 is for prompting the user to set up file information of data such as image data to be transmitted from the IWB 12*i* to the mobile terminal 10. In the screen 1090 of FIG. 23, information indicating a "STORAGE CONDITION", a "RESOLUTION", a "LOCATION", a "FILE FORMAT", and "ORIGINAL DATA OR DISPLAY DATA" are illustrated as exemplary items of file information to be set up by the user. Note that the information indicating "ORIGINAL DATA OR DISPLAY DATA" indicates whether the data such as image data to be transmitted from the IWB 12*i* to the mobile terminal 10 corresponds to display data displayed by the IWB 12*i* or original data before being converted into the display data.

As described above, in the input/output system 1 according to the fourth embodiment, after the user designates an operation to be performed by the input/output apparatus 12 by performing an operation of tracing (flicking) an input/output assist line included in a screen displayed by the mobile terminal 10, the user may be able to set up file information of data such as image data to be transmitted from the IWB 12*i* to the mobile terminal 10.

Note that in some embodiments, the file image 1100 may be displayed when the mobile terminal 10 accepts a flick operation of the user tracing the line 1060 over a short distance in the direction from the image 1005 of the IWB 12*i* toward the lower side. On the other hand, when the mobile terminal 10 accepts a flick operation of the user tracing the line 1006 over a long distance, the file image 1100 may not be displayed and default values for the file information of the data such as image data to be transmitted from the IWB 12*i* to the mobile terminal 10 may be used, for example.

Figure 24:
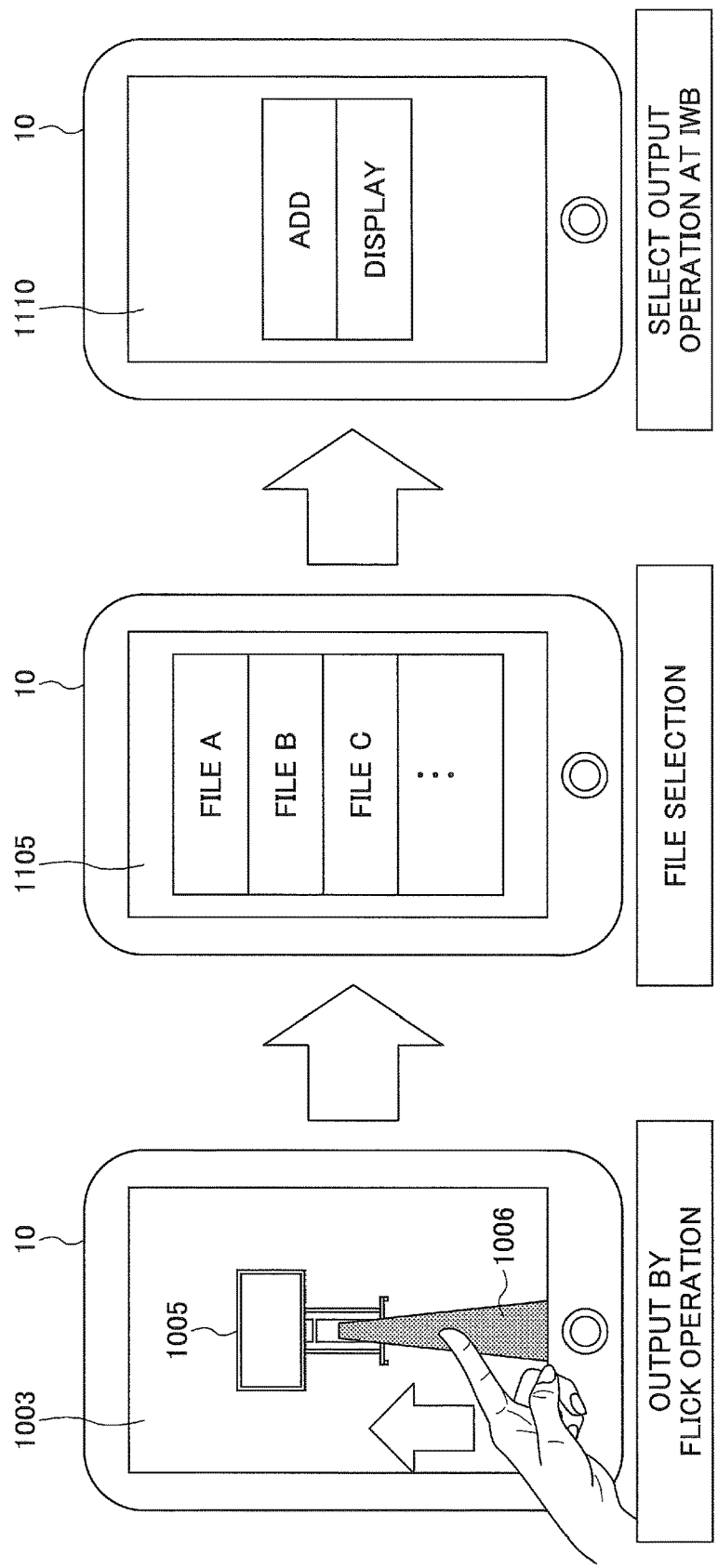
FIG. 24 illustrates another exemplary sequence of screen transitions of the mobile terminal in conjunction with user operations.

FIG. 24 illustrates another exemplary sequence of screen transitions of the mobile terminal 10 in connection with user operations. The left side image of FIG. 24 illustrates an exemplary case where the user performs a flick operation along the line 1006 in a direction from the lower side of the screen 1003 toward the image 1005 of the IWB 12*i*.

Upon accepting the flick operation along the line 1006 in the direction from the lower side of the screen 1003 toward the image 1005 of the IWB 12*i*, the screen display of the mobile terminal 10 may change from the screen 1003 to a screen 1105 illustrated in the middle of FIG. 24. The screen 1105 of FIG. 24 is for prompting the user to select a file such as an image data file to be transmitted from the mobile terminal 10 to the IWB 12*i*.

When a file such as an image data file to be transmitted to the IWB 12*i* is selected from the screen 1105 of FIG. 24, the screen display of the mobile terminal 10 may change from the screen 1105 to a screen 1110 illustrated on the right side of FIG. 24, for example. The screen 1110 of FIG. 24 is for prompting the user to select whether to add an output method of the IWB 12*i* or display the file selected from the screen 1105 at the IWB 12*i*.

As described above, in the input/output system 1 according to the fourth embodiment, after the user designates an operation to be performed by the input/output apparatus 12 by performing an operation of tracing (flicking) an input/output assist line included in a screen displayed by the mobile terminal 10, the user may be able to select an output method for outputting a file such as an image data file to be transmitted to the IWB 12*i*.

Figure 25:
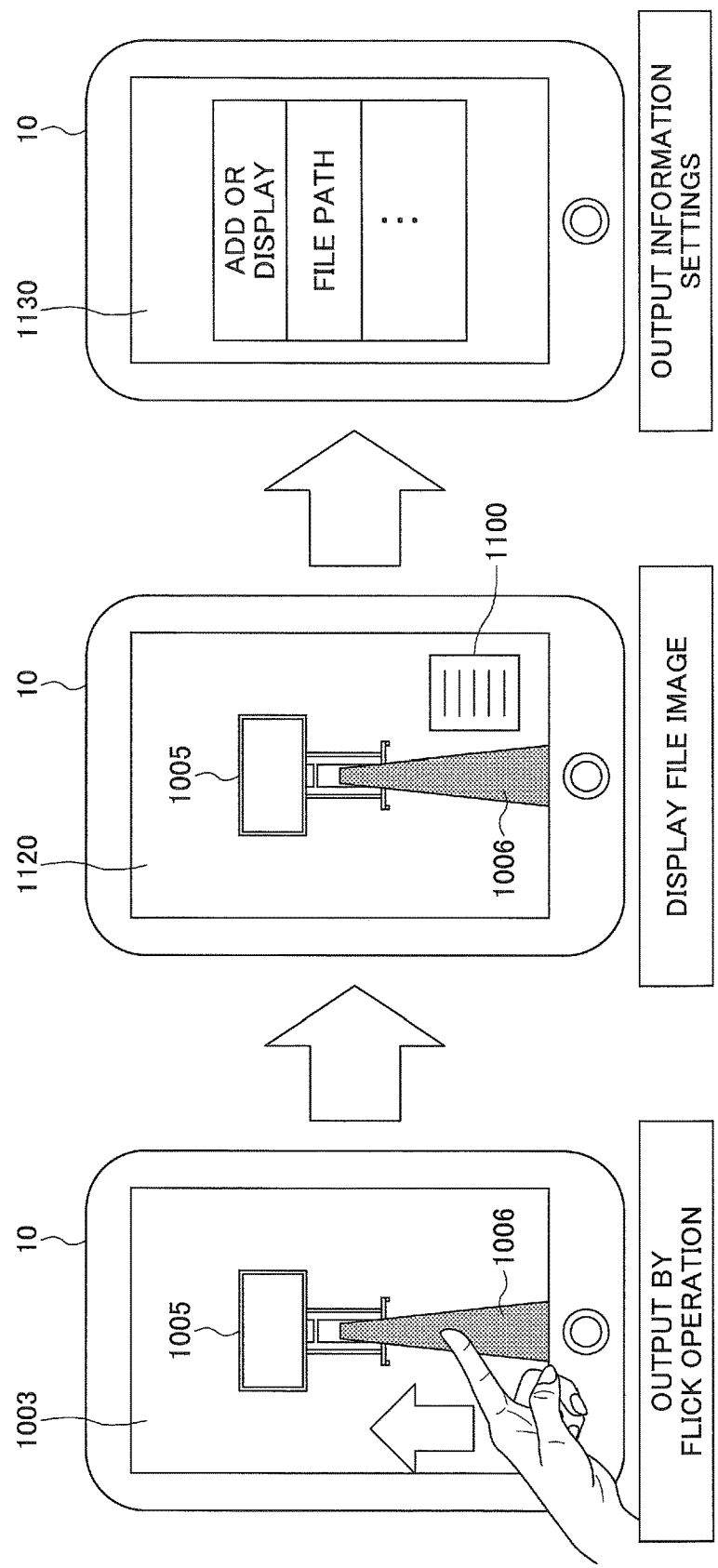
FIG. 25 illustrates another exemplary sequence of screen transitions of the mobile terminal in conjunction with user operations.

FIG. 25 illustrates another exemplary sequence of screen transitions of the mobile terminal 10 in connection with user operations. The left side image of FIG. 25 illustrates an exemplary case where the user performs a flick operation along the line 1006 in a direction from the lower side of the screen 1003 toward the image 1005 of the IWB 12*i*.

Upon accepting the flick operation along the line 1006 in the direction from the lower side of the screen 1003 toward the image 1005 of the IWB 12*i*, the screen display of the mobile terminal 10 may change from the screen 1003 to a screen 1120 displaying the file image 1100 as illustrated in the middle of FIG. 25. When the user touches the file image 1100 displayed in the screen 1120, for example, the screen display of the mobile terminal 10 may change from the screen 1120 to a screen 1130 illustrated on the right side of FIG. 25.

The screen 1130 as illustrated in FIG. 25 is for prompting the user to set up output information of a file such as an image file to be transmitted from the mobile terminal 10 to the IWB 12*i*. In the screen 1130, information indicating "ADD OR DISPLAY" as the file display method and the "FILE PATH" are shown as exemplary items of the output information to be set up by the user.

As described above, in the input/output system 1 according to the fourth embodiment, after the user designates an operation to be performed by the input/output apparatus 12 by performing an operation of tracing (flicking) an input/output assist line included in a screen displayed by the mobile terminal 10, the user may be able to set up output information for outputting a file such as an image data file to be transmitted from the mobile terminal 10 to the IWB 12*i*.

Note that in FIG. 25, the file image 1100 may be displayed when the mobile terminal 10 accepts a flick operation of the user tracing the line 1006 over a short distance in the direction from the lower side of the screen 1003 toward the image 1005 of the IWB 12*i*. On the other hand, when the mobile terminal 10 accepts a flick operation of the user tracing the line 1006 over a long distance, the file image 1100 may not be displayed and default values for the output information of the file to be transmitted may be used, for example.

Fifth Embodiment

In the following, the input/output system 1 according to a fifth embodiment of the present invention is described. In the input/output system 1 according to the first to fourth embodiments, an image of one single input/output apparatus 12 is included in the image captured by the camera. In the input/output system 1 according to the fifth embodiment, images of two input/output apparatuses 12 are included in the image captured by the camera.

Figure 26:
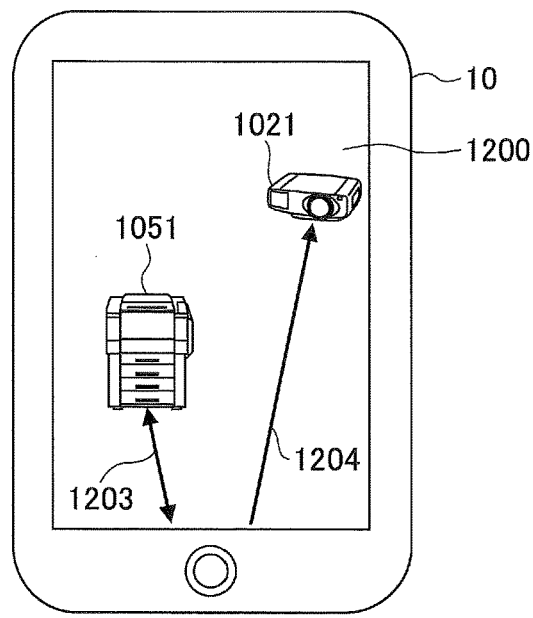
FIG. 26 illustrates an exemplary screen displaying multiple input/output apparatuses.

FIG. 26 illustrates an exemplary screen 1200 including images of a plurality of input/output apparatuses 12. For example, upon performing the processes of steps S17 to S19 of FIG. 11, the image captured by the camera of the mobile terminal 10 may include the image 1051 of the MFP 12*m* and the image 1021 of the projector 12*p*. In such case, the mobile terminal 10 may display the screen 1200 having arrows 1203 and 1204 composited thereon as illustrated in FIG. 26, for example. The arrows 1203 and 1204 are examples of input/output assist lines. Note that in some embodiments, the line 1006 may be used in place of the arrows 1203 and 1204, for example. Also, the process of compositing the input/output assist lines onto the image captured by the camera to generate the screen 1200 may be performed in a manner similar to the image composition process as described above, and as such, descriptions thereof are omitted.

As can be appreciated, in the input/output system 1 according to the present embodiment, even in a case where images of a plurality of input/output apparatuses 12 are included in an image captured by the camera of the mobile terminal 10, a corresponding input/output assist line for each image of the input/output apparatus 12 may be composited onto the image captured by the camera.

Sixth Embodiment

In the following, the input/output system 1 according to a sixth embodiment of the present invention is described. In the input/output system 1 according to the first to fifth embodiments, an input/output assist line is composited onto the image captured by the camera. In the input/output system 1 according to the sixth embodiment, the image captured by the camera is displayed without an input/output assist line being composited thereon.

Figure 27:
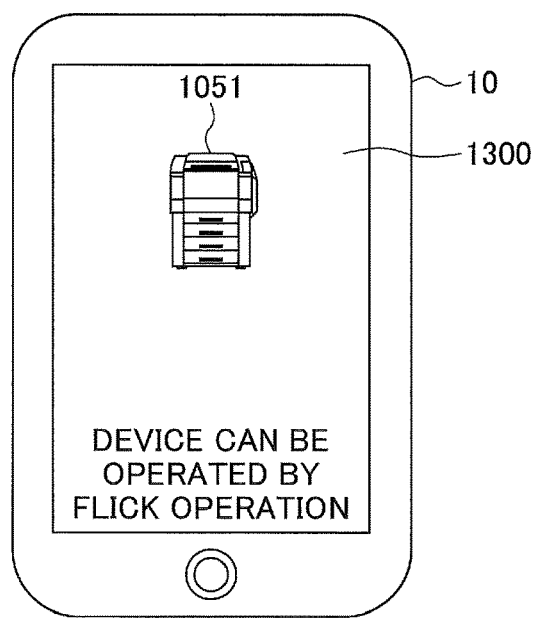
FIG. 27 illustrates an exemplary screen displaying an input/output apparatus.
Figure 28:
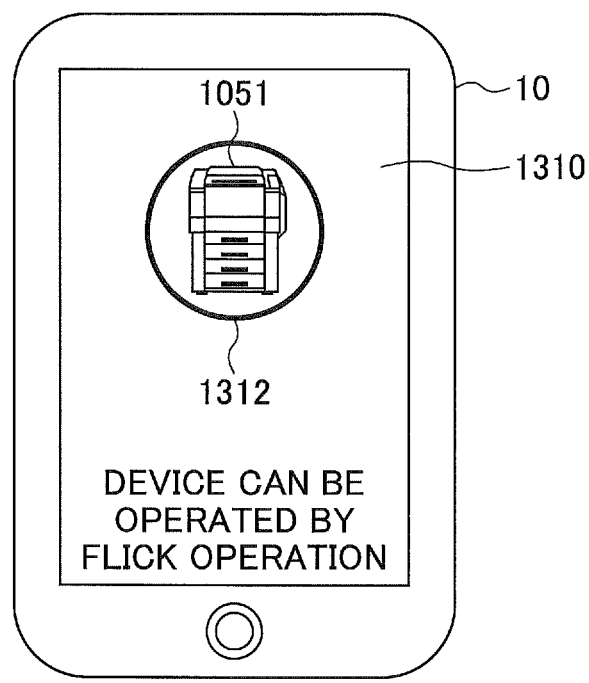
FIG. 28 illustrates another exemplary screen displaying an input/output apparatus.

FIG. 27 illustrates an exemplary screen 1300 including the image 1201 of the MFP 12m as the input/output apparatus 12. For example, upon performing the process of step S19 of FIG. 11, the mobile terminal 10 may display the screen 1300 including a message stating "DEVICE CAN BE OPERATED BY FLICK OPERATION" (note, however, that such a message does not have to be displayed). In another example, upon performing the process of step S19 of FIG. 11, the mobile terminal 10 may composite a FIG. 1312 onto the image 1201 of the MFP 12m included in the image captured by the camera to generate and display a screen 1310 as illustrated in FIG. 28.

As can be appreciated, in the input/output system 1 according to the present embodiment, the input/output apparatus 12 may be operated from the mobile terminal 10 even when an input/output assist line is not composited onto the image captured by the camera of the mobile terminal 10.

Seventh Embodiment

In the following, the input/output system 1 according to a seventh embodiment of the present invention is described. In the input/output system 1 according to the previously-described embodiments, the information processing apparatus 14 manages the devices within the input/output system 1. On the other hand, in the present embodiment the information processing apparatus 14 is not used.

Figure 29:
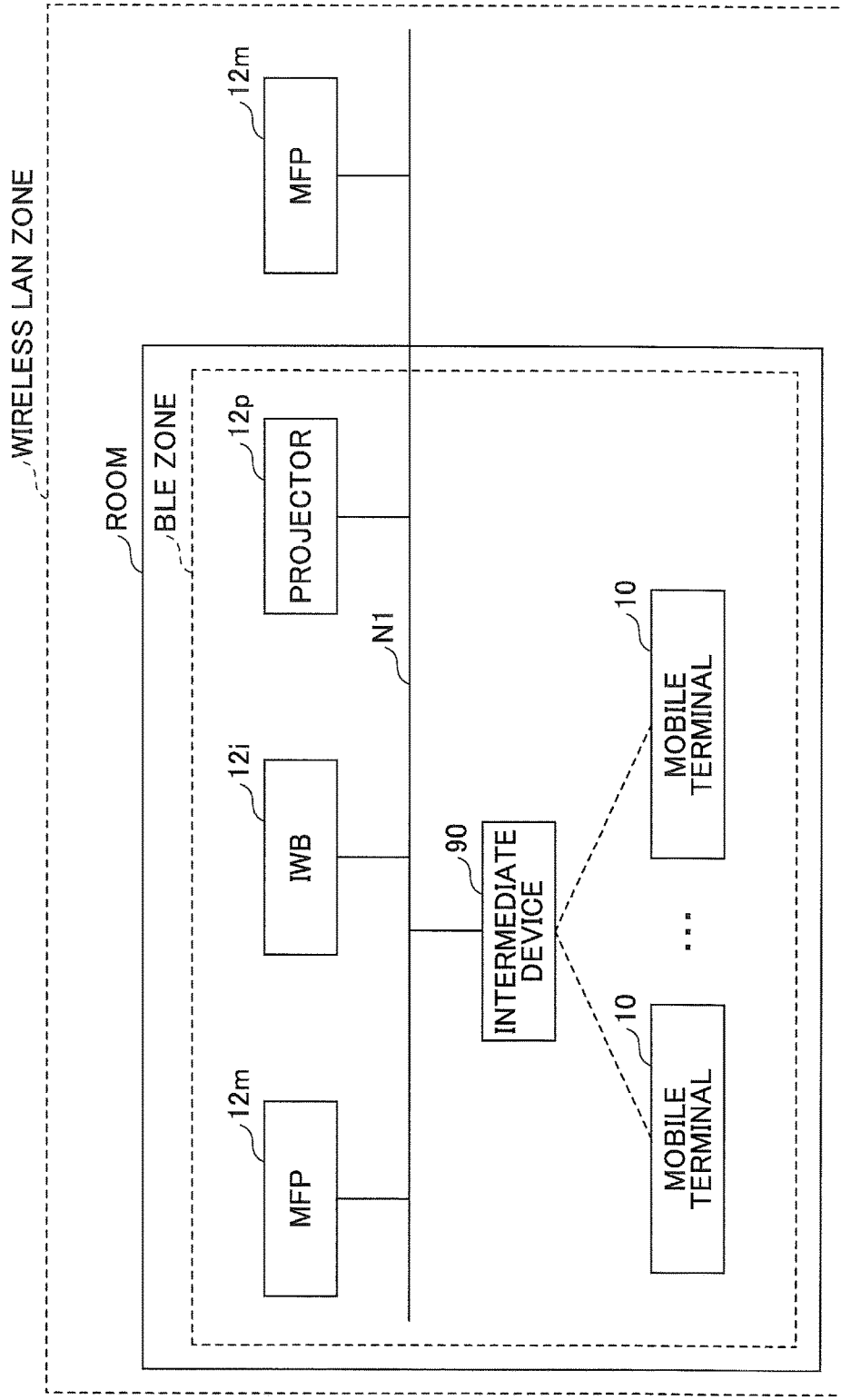
FIG. 29 is a block diagram illustrating an exemplary communication system according to an embodiment of the present invention.

FIG. 29 is a block diagram illustrating an exemplary configuration of a communication system 2 according to the present embodiment. In FIG. 29, the communication system 2 includes an intermediate device 90, one or more mobile terminals 10, the MFP 12m, the IWB 12i, and the projector 12p.

In the communication system 2, the intermediate device 90, the MFP 12m, the IWB 12i, and the projector 12p are connected to the network N1 such as a LAN. Also, in the communication system 2, the intermediate device 90 is capable of establishing communication with the one or more mobile terminals 10 via wireless LAN communication and BLE (Bluetooth (registered trademark) Low Energy) communication.

In FIG. 29, an area within which the intermediate device 90 is capable of establishing BLE communication is enclosed by a dotted line and is indicated as "BLE ZONE". In FIG. 29, the BLE zone is within a room. Also, in FIG. 29, an area within which the intermediate device 90 is capable of establishing wireless LAN communication is enclosed by a dotted line and is indicated as "WIRELESS LAN ZONE". In FIG. 29, the wireless LAN zone extends beyond the size of the room. Note that the size of the BLE zone and the size of the wireless LAN zone illustrated in FIG. 29 are merely illustrative examples, and in the present embodiment, the wireless LAN zone is simply larger than the BLE zone. The network N1 of FIG. 29 may be configured to implement wired LAN communication and/or wireless LAN communication.

The intermediate device 90 may be implemented by a wireless LAN router, for example. The intermediate device 90 is capable of establishing BLE communication with the mobile terminal 10 that exists within the BLE zone. The intermediate device 90 provides access configuration information (connection information) to the mobile terminal 10 that enters the BLE zone using BLE communication. Note that BLE communication is an example of short-range wireless communication.

The mobile terminal 10 is a terminal apparatus that is operated by a user, and may be, for example, a smartphone, a mobile phone, a notebook PC, a tablet, or the like. The mobile terminal 10 is capable of accessing the intermediate device 90 using BLE communication and wireless LAN communication.

The MFP 12m, the IWB 12i, and the projector 12p are examples of an electronic device that communicates with the mobile terminal 10. The MFP 12m may include an imaging function and an image forming function, for example. The IWB 12i is an example of an image display apparatus. The projector 12p is an example of an image projection apparatus. As illustrated in FIG. 29, an electronic device such as the MFP 12m may also be installed outside the BLE zone.

<Hardware Configuration>
<<Intermediate Device>>

Figure 30:
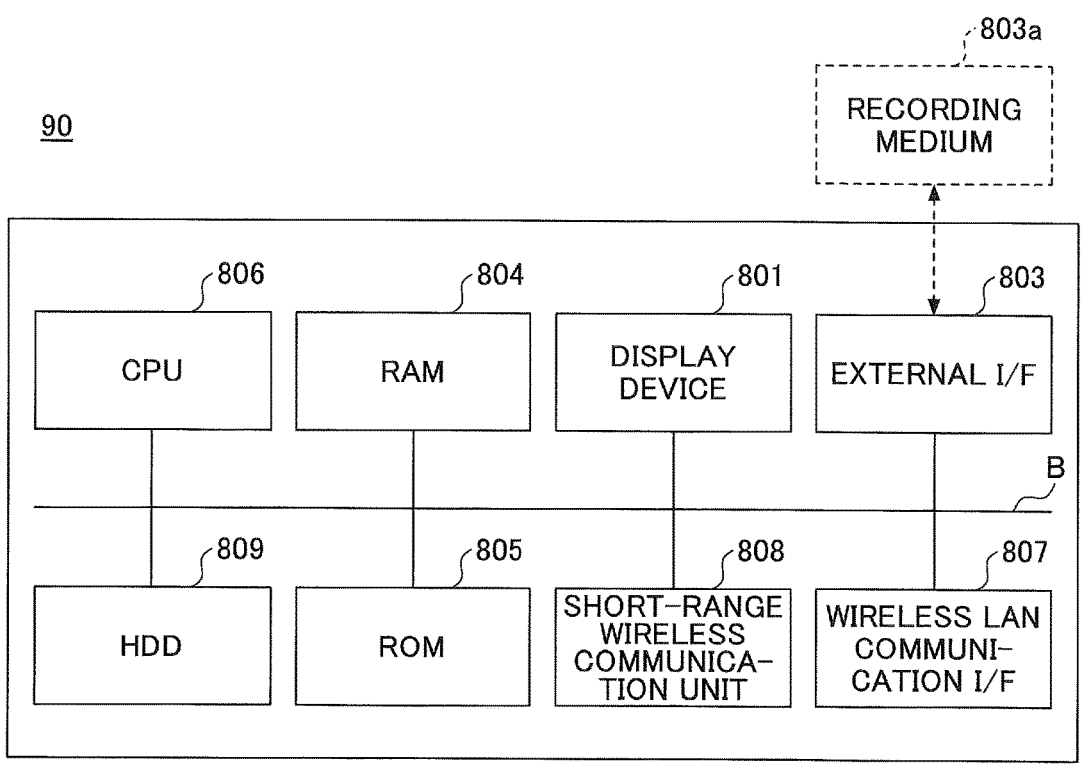
FIG. 30 is a block diagram illustrating an exemplary hardware configuration of an intermediate device according to an embodiment of the present invention.

The intermediate device 90 may have a hardware configuration as illustrated in FIG. 30, for example. FIG. 30 is a block diagram illustrating an exemplary hardware configuration of the intermediate device 90 according to the present embodiment.

In FIG. 30, the intermediate device 90 includes a display unit 801, an external I/F 803, a RAM 804, a ROM 805, a CPU 806, a wireless LAN communication I/F 807, a short-range wireless communication I/F 808, and a HDD 809 that are interconnected by a bus B.

The display unit 801 may use a LED (light emitting diode) or the like to display a status of the intermediate device 90, for example. The wireless LAN communication I/F 807 is for establishing wireless communication with an electronic device such as the mobile terminal 10 and the projector 12p. The short-range wireless communication I/F 808 is an interface for establishing short-range wireless communication with the mobile terminal 10.

The HDD 809 is an example of a nonvolatile storage device that stores programs and data. The programs and data stored in the HDD 809 may include an OS as basic software for controlling overall operations of the intermediate device 90 and application software for providing various functions on the OS. Note that in some embodiments, the intermediate device 90 may include a drive apparatus that uses a flash memory as a recording medium (e.g. SSD) instead of the HDD 809, for example.

The external I/F 803 is an interface with an external device. The external device may include a recording medium 803a, for example. In this way, the intermediate device 90 may read from and/or write data on the recording medium 803a via the external I/F 803. Specific examples of the recording medium 803a include a flexible disk, a CD, a DVD, ad SD memory card, a USB memory, and the like.

The ROM 805 is an example of a nonvolatile semiconductor memory (storage device) that can retain programs and data even when the power is turned off. The ROM 805 may store programs and data such as BIOS to be executed upon starting the intermediate device 90, OS settings, and network setting, for example. The RAM 804 is an example of a volatile semiconductor memory (storage device) that temporarily stores programs and data.

The CPU 806 is a computing unit that reads a program and/or data from a storage device such as the ROM 805 or the HDD 809, loads the program and/or data on the RAM 804, and executes a process based on the read program and/or data. In this way, the CPU 806 controls the overall operations of the intermediate device 90 and implements various functions of the intermediate device 90. The intermediate device 90 may perform various process operations as described below using the hardware configuration as illustrated in FIG. 30, for example.

In the following, exemplary process operations of the communication system 2 according to the present embodiment are described with reference to FIG. 31.

In FIG. 31, when the mobile terminal 10 enters a communication range for establishing short-range wireless communication with the intermediate device 90 (step S101), short-range wireless communication between the mobile terminal 10 and the intermediate device 90 is started (step S102). For example, to start BLE communication, pairing between the mobile terminal 10 and the intermediate device 90 may be established such that the mobile terminal 10 and the intermediate device 90 may be able to communicate using BLE communication.

When the short-range wireless communication between the intermediate device 90 and the mobile terminal 10 is started, the intermediate device 90 transmits wireless LAN connection information for establishing connection with the wireless LAN (e.g. SSID and password of wireless LAN) to the mobile terminal 10 via short-range wireless communication (step S103). The mobile terminal 10 uses the received wireless LAN connection information to transmit a connection request for establishing connection with the wireless LAN to the intermediate device 90 (step S104). Upon receiving the connection request for establishing connection with the wireless LAN, the intermediate device 90 determines whether the connection request is using correct connection information (SSID and password). When it is determined that the connection request is using the correct connection information, the intermediate device 90 allows the mobile terminal 10 to access the wireless LAN, and the mobile terminal 10 starts communication via the wireless LAN (step S105).

Once the mobile terminal 10 becomes capable of exchanging communications via the wireless LAN, the mobile terminal 10 transmits a query to one or more devices connected to the wireless LAN (steps S106 to S109). For example, the mobile terminal 10 may send a query to the IP addresses of all devices that are connected to the wireless LAN. The query may include a request for device information such as that illustrated in FIG. 10 (e.g. information indicating the device name, the device position, functions of the device).

The mobile terminal 10 receives a response via the wireless LAN from each of the devices connected to the wireless LAN (steps S110 to S113). The response includes the device information that was requested in the query. The mobile terminal 10 stores the received device information included in the received response (step S114).

Then, process steps substantially identical to the processes of step S12 and subsequent steps of FIG. 11 are performed in the present embodiment. Note, however, that although the mobile terminal 10 acquires device information from the information processing apparatus 14 in steps S14 and S15 of FIG. 11, in the present embodiment, the processes of steps S14 and S15 may be omitted because the mobile terminal 10 has already acquired the device information from the response from each of the devices.

By configuring the communication system 2 as described above, the functions and features of the previously-described embodiments may be implemented without installing the information processing apparatus 14.

<Summary>

As described above, in the input/output system 1 according to the above-described embodiments, an input/output assist line may be composited onto an image of the input/output apparatus 12 that is displayed in a user interface of the mobile terminal 10, and in this way, an operation to be performed by the input/output apparatus 12 may be designated from the mobile terminal 10 through intuitive operations.

Although the present invention has been described above with reference to certain illustrative embodiments, the present invention is not limited to these embodiments, and numerous variations and modifications may be made without departing from the scope of the present invention.

Note that the mobile terminal 10 is an example of a terminal apparatus according to the present invention. The MFP 12$m$, the projector 12$p$, and the IWB 12$i$ are examples of an input/output apparatus according to the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2014-187360 filed on Sep. 16, 2014, and Japanese Patent Application No. 2015-164570 filed on Aug. 24, 2015, the entire contents of which are hereby incorporated by reference.

What is claimed is:

1. A terminal apparatus comprising:
a display;
a camera configured to capture an image;
a processor; and a memory including instructions that, upon execution by the processor, cause the processor to:

determine a position of the terminal apparatus;

determine an imaging direction of the camera;

identify an input/output apparatus included in the image captured by the camera based on position information of the input/output apparatus, the position of the terminal apparatus, and the imaging direction of the camera;

generate a composite image of a line extending in a direction of the input/output apparatus onto the captured image, the line being provided as an input/output assist line, and the composite image including an image of the input/output apparatus;

prompt the display to display the composited image;

accept an operation along the input/output assist line in the composite image that is displayed by the display; and determine whether to make a data output request to output data from the terminal apparatus to the input/output apparatus or to make a data input request to input data from the terminal apparatus to the input/output apparatus based on a direction of the accepted operation along the input/output assist line, wherein in a case where the accepted operation along the input/output assist line in the composite image is in a direction away from the image of the input/output apparatus, the processor generates an icon representative of a data file, adds the data file icon to the composited image that is displayed on the display of the terminal apparatus, and, upon operation of the data file icon, prompts a user to set up file information of data to be transmitted from the input/output apparatus to the terminal apparatus, and in a case where the accepted operation along the input/output assist line in the composite image is in a direction toward the image of the input/output apparatus, the processor generates a selection screen for prompting the user to select a data file to be transmitted from the terminal apparatus to the input/output apparatus and prompts the display to transition from displaying the composite image to the selection screen.

2. The terminal apparatus as claimed in claim 1, wherein in a case where the input/output apparatus is capable of accepting a request for an operation including data transmission from the input/output apparatus to the terminal apparatus as the operation to be performed by the input/output apparatus, a single arrow pointing in a direction away from the image of the input/output apparatus included in the composite image as the input/output assist line.

3. The terminal apparatus as claimed in claim 2, wherein in a case where the input/output apparatus is capable of accepting a plurality of different requests for a plurality of different types of operations including data transmission from the input/output apparatus to the terminal apparatus as the operation to be performed by the input/output apparatus, a plurality of the single arrows, pointing in the direction away from the image of the input/output apparatus, corresponding to the plurality of different types of operations is composited as the input/output assist line.

4. The terminal apparatus as claimed in claim 1, wherein in a case where the input/output apparatus is capable of accepting a request for an operation including data transmission from the terminal apparatus to the input/output apparatus as the operation to be performed by the input/output apparatus, a single arrow pointing in a direction toward the image of the input/output apparatus included in the composite image as the input/output assist line.

5. The terminal apparatus as claimed in claim 4, wherein in a case where the input/output apparatus is capable of accepting a plurality of different requests for a plurality of different types of operations including data transmission from the terminal apparatus to the input/output apparatus as the operation to be performed by the input/output apparatus, a plurality of the single arrows, pointing in the direction toward the image of the input/output apparatus, corresponding to the plurality of different types of operations is composited as the input/output assist line.

6. The terminal apparatus as claimed in claim 1, wherein in a case where the input/output apparatus is capable of accepting a request for an operation including data transmission from the input/output apparatus to the terminal apparatus as the operation to be performed by the input/output apparatus and a request for an operation including data transmission from the terminal apparatus to the input/output apparatus as the operation to be performed by the input/output apparatus, a double arrow pointing in a direction away from the image of the input/output apparatus included in the composite image and a direction toward the image of the input/output apparatus as the input/output assist line.

7. The terminal apparatus as claimed in claim 1, wherein an image of the terminal apparatus is composited at one side of the input/output assist line, opposite the image of the input/output apparatus included in the composite image.

8. The terminal apparatus as claimed in claim 1, wherein execution of the instructions further causes the processor to:

display a screen for accepting a setting for making the request to output data from the terminal apparatus to the input/output apparatus in a case where it is determined that the data output request to the input/output apparatus will be made, and display a screen for accepting a setting for making a request to input data from the terminal apparatus to the input/output apparatus in a case where it is determined that the data input request to the input/output apparatus will be made.

9. An operation designation method that is implemented by a terminal apparatus, the operation designation method comprising:

determining a position of the terminal apparatus;

capturing an image with a camera of the terminal apparatus;

determining an imaging direction of the camera;

identifying an input/output apparatus included in the image captured by the camera based on position information of the input/output apparatus, the position of the terminal apparatus, and the imaging direction of the camera;

generating a composite image of a line extending in a direction of the input/output apparatus onto the captured image, the line being provided as an input/output assist line, and the composite image including an image of the input/output apparatus;

display the generated composite image on a display of the terminal apparatus;

accepting an operation along the input/output assist line in the composite image that is displayed by the display;

determining whether to make a data output request to output data from the terminal apparatus to the input/output apparatus or to make a data input request to input data from the terminal apparatus to the input/output apparatus based on a direction of the accepted operation along the input/output assist line, wherein in a case where the accepted operation along the input/output assist line in the composite image is in a direction away from the image of the input/output apparatus, the processor generates an icon representative of a data file, adds the data file icon to the composited image that is displayed on the display of the terminal apparatus, and, upon operation of the data file icon, prompts a user to set up file information of data to be transmitted from the input/output apparatus to the terminal apparatus, and in a case where the accepted operation along the input/output assist line in the composite image is in a direction toward the image of the input/output apparatus, the processor generates a selection screen for prompting the user to select a data file to be transmitted from the terminal apparatus to the input/output apparatus and prompts the display to transition from displaying the composite image to the selection screen.

10. The operation designation method as claimed in claim 9, wherein the method further comprises:

displaying a screen for accepting a setting for making the request to output data from the terminal apparatus to the input/output apparatus in a case where it is determined that the data output request to the input/output apparatus will be made, and displaying a screen for accepting a setting for making a request to input data from the terminal apparatus to the input/output apparatus in a case where it is determined that the data input request to the input/output apparatus will be made.

11. A non-transitory computer readable storage medium storing a program that, when executed by a computer, causes the computer to execute a method of controlling a terminal apparatus, the method comprising:

determining a position of the terminal apparatus;

capturing an image with a camera of the terminal apparatus;

determining an imaging direction of the camera;

identifying an input/output apparatus included in the image captured by the camera based on position information of the input/output apparatus, the position of the terminal apparatus, and the imaging direction of the camera;

generating a composite image of a line extending in a direction of the input/output apparatus onto the captured image, the line being provided as an input/output assist line, and the composite image including an image of the input/output apparatus;

displaying the composited image on a display of the terminal apparatus;

accepting an operation along the input/output assist line in the composite image that is displayed by the display;

determining whether to make a data output request to output data from the terminal apparatus to the input/output apparatus or to make a data input request to input data from the terminal apparatus to the input/output apparatus based on a direction of the accepted operation along the input/output assist line, wherein in a case where the accepted operation along the input/output assist line in the composite image is in a direction away from the image of the input/output apparatus, the processor generates an icon representative of a data file, adds the data file icon to the composited image that is displayed on the display of the terminal apparatus, and, upon operation of the data file icon, prompts a user to set up file information of data to be transmitted from the input/output apparatus to the terminal apparatus, and in a case where the accepted operation along the input/output assist line in the composite image is in a direction toward the image of the input/output apparatus, the processor generates a selection screen for prompting the user to select a data file to be transmitted from the terminal apparatus to the input/output apparatus and prompts the display to transition from displaying the composite image to the selection screen.

12. The non-transitory computer readable storage medium according to claim 11, wherein the method further comprises:

displaying a screen for accepting a setting for making the request to output data from the terminal apparatus to the input/output apparatus in a case where it is determined that the data output request to the input/output apparatus will be made, and displaying a screen for accepting a setting for making a request to input data from the terminal apparatus to the input/output apparatus in a case where it is determined that the data input request to the input/output apparatus will be made.

* * * * *